US012361663B2

(12) United States Patent
Bradley et al.

(10) Patent No.: US 12,361,663 B2
(45) Date of Patent: Jul. 15, 2025

(54) DYNAMIC FACIAL HAIR CAPTURE OF A SUBJECT

(71) Applicants: Disney Enterprises, Inc., Burbank, CA (US); ETH Zürich (Eidgenössische Technische Hochschule Zürich), Zürich (CH)

(72) Inventors: Derek Edward Bradley, Zürich (CH); Paulo Fabiano Urnau Gotardo, Zürich (CH); Gaspard Zoss, Zürich (CH); Prashanth Chandran, Zürich (CH); Sebastian Winberg, Zürich (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 69 days.

(21) Appl. No.: 18/102,498

(22) Filed: Jan. 27, 2023

(65) Prior Publication Data

US 2023/0237753 A1 Jul. 27, 2023

Related U.S. Application Data

(60) Provisional application No. 63/303,723, filed on Jan. 27, 2022.

(51) Int. Cl.
*G06T 15/00* (2011.01)
*G06T 7/246* (2017.01)
(Continued)

(52) U.S. Cl.
CPC .............. *G06T 19/20* (2013.01); *G06T 7/251* (2017.01); *G06T 7/344* (2017.01); *G06T 7/55* (2017.01);
(Continued)

(58) Field of Classification Search
CPC ......... G06T 19/00; G06T 17/20; G06T 17/00; G06T 15/10; G06T 15/00; G06T 13/40;
(Continued)

(56) References Cited

U.S. PATENT DOCUMENTS

2009/0153552 A1* 6/2009 Fidaleo .................. G06Q 30/02
345/419
2012/0313937 A1* 12/2012 Beeler ..................... G06T 19/00
345/419

(Continued)

OTHER PUBLICATIONS

Agarwal, et al., "Ceres Solver", http://ceres-solver.org, downloaded Jan. 27, 2023, pp. 1-262.

(Continued)

*Primary Examiner* — Gordon G Liu
(74) *Attorney, Agent, or Firm* — Kilpatrick Townsend & Stockton LLP

(57) ABSTRACT

Embodiments of the present disclosure are directed to methods and systems for generating three-dimensional (3D) models and facial hair models representative of subjects (e.g., actors or actresses) using facial scanning technology. Methods accord to embodiments may be useful for performing facial capture on subjects with dense facial hair. Initial subject facial data, including facial frames and facial performance frames (e.g., images of the subject collected from a capture system) can be used to accurately predict the structure of the subject's face underneath their facial hair to produce a reference 3D facial shape of the subject. Likewise, image processing techniques can be used to identify facial hairs and generate a reference facial hair model. The reference 3D facial shape and reference facial hair mode can subsequently be used to generate performance 3D facial shapes and a performance facial hair model corresponding to a performance by the subject (e.g., reciting dialog).

17 Claims, 16 Drawing Sheets

(51) Int. Cl.
*G06T 7/33* (2017.01)
*G06T 7/55* (2017.01)
*G06T 13/40* (2011.01)
*G06T 17/20* (2006.01)
*G06T 19/20* (2011.01)
*G06V 40/16* (2022.01)

(52) U.S. Cl.
CPC .............. *G06T 13/40* (2013.01); *G06T 17/20* (2013.01); *G06V 40/165* (2022.01); *G06T 2207/10016* (2013.01); *G06T 2207/20076* (2013.01); *G06T 2207/30201* (2013.01); *G06T 2210/21* (2013.01); *G06T 2219/2004* (2013.01); *G06T 2219/2021* (2013.01)

(58) Field of Classification Search
CPC ......... G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06F 16/51; G06F 21/602; H04N 23/64; H04N 23/90; H04N 23/611; H04N 23/635; G06V 20/20
USPC ....................................................... 345/419
See application file for complete search history.

(56) References Cited

U.S. PATENT DOCUMENTS

| | | |
|---|---|---|
| 2015/0227680 A1 | 8/2015 | Mainkar et al. |
| 2019/0035149 A1* | 1/2019 | Chen .................. G06V 40/166 |
| 2021/0248763 A1* | 8/2021 | Gao .................... G06V 40/162 |
| 2021/0390751 A1* | 12/2021 | Sagar ..................... G06T 13/40 |
| 2023/0237753 A1 | 7/2023 | Bradley et al. |
| 2024/0312033 A1 | 9/2024 | Moser |

OTHER PUBLICATIONS

Arun, et al., "Least-Squares Fitting of Two 3D Point Sets", IEEE Transactions on Pattern Analysis and Machine Intelligence, PAMI-9(5), 1987, pp. 698-700.

Beeler, et al., "Coupled 3D Reconstruction of Sparse Facial Hair and Skin", ACS Transactions on Graphics, vol. 31, No. 4, Article 117, Jul. 2012, pp. 1-10.

Beeler, et al., "High-Quality Passive Facial Performance Capture Using Anchor Frames", ACM Trans. Graph., 30(4), Jul. 2011, pp. 1-10.

Beeler, et al., "High-Quality Single-Shot Capture of Facial Geometry", ACM Trans. Graph., 29(4), Jul. 2010, pp. 1-9.

Beeler, et al., "Rigid Stabilization of Facial Expressions", ACM Trans. Graph., 33(4), Jul. 2014, pp. 1-9.

Brox, et al., "High Accuracy Optical Flow Estimation Based on a Theory for Warping", Computer Vision—ECCV 2004, Lecture Notes in Computer Science, vol. 3024, Springer, Berlin., 2004, pp. 25-26.

Nam, et al., "Strand-Accurate Multi-View Hair Capture", In Proceedings of the IEEE/CVF Conference on Computer Vision and Pattern Recognition (CVPR), Jun. 2019, pp. 155-164.

Riviere, et al., "Single-Shot High-Quality Facial Geometry and Skin Appearance Capture", ACM Trans. Graph., vol. 39, No. 4, Article 81, Jul. 2020, pp. 1-12.

Sorkine, et al., "Laplacian Surface Editing", In Proceedings of the 2004 Eurographics/ACM SIGGRAPH Symposium on Geometry Processing, SGP '04, New York, NY, USA, 2004. Association for Computing Machinery, 2004, pp. 175-184.

U.S. Appl. No. 18/102,480, "Non-Final Office Action", Dec. 9, 2024, 9 pages.

U.S. Appl. No. 18/102,480, "Notice of Allowance", Mar. 17, 2025, 8 pages.

* cited by examiner

PERFORMANCE 3D FACIAL SHAPES AND ARTIST EDITED FACIAL HAIR MODELS
1500

DYNAMIC FACIAL HAIR CAPTURE OF A SUBJECT

CROSS-REFERENCES TO RELATED APPLICATIONS

This application claims the benefit of U.S. Provisional Application No. 63/303,723, filed on Jan. 27, 2022, the contents of which are hereby incorporated by reference in its entirety for all purposes.

U.S. patent application Ser. No. 18/102,480 entitled "Generating a Facial-Hair-Free Mesh of a Subject," is being filed concurrently, and the entire disclosure of which is hereby incorporated by reference into this application in its entirety for all purposes.

BACKGROUND

Many contemporary feature films involve both a mix of live action acting and computer generated imagery. Some films entirely comprise computer generated imagery. Such films may including digital characters rendered from three-dimensional (3D) models (sometimes referred to as "3D shapes"). For decades, motion capture of real actors and actresses (or "subjects") have been used to produce realistic digital character performances. Motion capture and computer generated imagery can be useful for producing scenes that may be difficult or impossible to convincingly film using live actors or practical effects, such as complex action or fantasy sequences.

Motion capture (also referred to as "capture" or "performance capture") can be performed using images and videos collected from cameras, particularly multi-camera reconstruction systems (more generically, "capture systems"). Such systems can accurately recover a subject's movements digitally, which is particularly popular among filmmakers for "facial performances" (e.g., an actor or actress delivering lines of dialog). Videos or images collected from a capture system can be used to generate 3D models of the subject, which can then be manipulated, edited, and rendered in order to accurately portray the subject and their performance in a film.

There are a variety of useful applications for motion capture and particularly facial performance capture. For example, digitally reconstructed performances can be edited by 3D artists in order to age or de-age a character in a film, e.g., enabling an older actor to play a younger version of their character in a flashback scene, or enabling a younger actor to play an older version of their character in a flash-forward scene. As another example, digitally reconstructed performances can be edited by 3D artists in order to generate performances corresponding to fantasy or science fiction characters. A facial performance by an actress portraying a space alien could be used to animate a performance by a digital space alien, which may obviate the need for unrealistic prosthetics for the actress. Further, many special effects may be achieved using facial performance capture. A first character could "shapeshift" into a second character by digitally superimposing a 3D facial shape of the second character over the first character's face.

One major obstacle to accurate facial capture is facial hair (e.g., beards, moustaches, eyebrows, etc.). While human facial skin can have texture in the form of pores, blemishes, and facial scarring, it is generally smooth. This is in contrast to facial hair, which often has a coarse and complex texture. Facial hair is often mutually occluding, meaning that some facial hairs obstruct the view of other facial hairs. This can make detecting facial hair difficult for multi-view camera facial performance capture systems. Many facial capture systems are effective at modelling smooth surfaces, and are therefore effective at digitally reproducing facial performances by clean-shave subjects. However, these systems are ineffective at modelling the coarse and complex structure of facial hair, and are therefore ineffective for generating 3D models of subjects with facial hair.

One particular problem is modelling facial hair itself. Facial hair can comprise a large number of individual hairs with different lengths, shapes, and orientations. However, when performing a facial capture of a subject with facial hair using conventional facial capture technology, the subject's facial hair is directly integrated into the model of the subject's face, usually as unrealistic bumpy, "shrink wrapped," or flickering model geometry. As such, conventional facial capture techniques often fail to produce facial hair models that can be satisfactorily used in film production. As a result, 3D artists are often required to create facial hair models from scratch or from reference pictures, which can be a time and labor intensive process.

Another problem is that facial model geometry in regions covered by facial hair is usually inaccurate, unrealistic, visually distracting, or generally of low quality. A facial performance capture system may model subject with a long beard as having a long, protruding chin, which is neither realistic nor particularly useful for a film production. Such a model does not accurately represent the shape of the subject's face beneath their facial hair (e.g., at the jawline). As such, in addition to failing to model facial hair itself, conventional facial capture systems often fail to produce accurate models of the structure of subject's faces.

As a consequence, it is accepted practice to require actors to shave prior to performing facial capture, which is an inconvenience for several reasons. It can be an inconvenience to subjects, as it may cause a large and undesired change in their appearance, and may require many months for them to regrow their facial hair to the same length and density. It can also create film scheduling challenges, particularly if a subject is playing a character known for distinctive facial hair. In such a case, all principal photography needs to be performed either before the subject's facial capture or delayed (sometimes by several months) until the subject regrows their facial hair.

Embodiments address these and other problems, individually and collectively.

SUMMARY

Embodiments of the present disclosure are directed to a variety of methods and systems related to facial capture of subjects with facial hair. As referenced above in the background, accurately performing facial capture on subjects with facial hair is a generally unsolved problem, and leads to a variety of difficulties for film schedules, actors, and actresses. Methods according to embodiments can be understood with reference to a performance capture "pipeline," which is described in more detail further below. The "inputs" and "outputs" to the pipeline are summarize immediately below.

In broad terms, the inputs to the pipeline can comprise initial subject facial data corresponding to a subject. This can comprise, e.g., images or videos comprising multiple images of the subject, which may be referred to as "frames." These may include "reference frames" along with "performance frames," which can comprise images or videos of the subject during a facial performance, e.g., the delivery of lines of dialog. This initial subject facial data may be captured using a facial performance capture system (e.g., the Medusa Facial Performance Capture System) which may comprise a specialized camera array used to capture multi-view images of subjects.

In broad terms, the outputs of the pipeline can comprise 3D facial shapes that can be useful to filmmakers. These outputs can include a "reference 3D facial shape" which is representative of the subject's face without facial hair. For example, if a bearded subject is scanned using a facial performance capture system, the reference 3D facial shape can generally represent the appearance of the bearded subject as if they were clean shaven. These outputs can also include a "performance sequence" comprising a plurality of "performance 3D facial shapes," which can generally represent the subject without facial hair during a facial performance. For example, if the bearded subject was scanned while delivering lines of dialog, the performance sequence can generally represent the appearance of the bearded subject delivering those lines of dialog as if they were clean shaven. As such, methods according to embodiments are useful to actors, actresses, and filmmakers because they enable filmmakers to perform facial performance capture (producing clean-shaven 3D facial shapes) without requiring the actor or actress to shave prior to their performance.

The outputs of this pipeline can further comprise facial hair models that can likewise be useful to filmmakers. These outputs can include a "reference facial hair model" which can comprise a representation of the subject's facial hair, somewhat analogous to the reference 3D facial shape. For example if a bearded subject is scanned using a facial performance capture system, the reference facial hair model can comprise data that (when rendered) matches the appearance of the subject's beard. These outputs can further include a "performance facial hair model," a representation of the subject's facial hair during a facial performance. For example, if the bearded subject is scanned while delivering lines of dialog, the performance facial hair model can generally represent the appearance and movement of the subject's beard as the subject delivers that dialog. A "facial hair model" collectively comprising the reference facial hair model and the performance facial hair model can be useful to 3D artists, as it negates the need for 3D artists to re-model the subject's facial hair (e.g., if the subject was required to shave prior to facial performance capture). Further, 3D artists can modify the facial hair model as needed. As an example, if a character is being aged or de-aged in a film, television show, video game, etc., a 3D artist can digitally recolor the facial hair model gray (or remove gray) in order to reflect the aging or de-aging.

Collectively, the performance sequence and the performance facial hair model provide an accurate 3D visual representation of the subject and their facial hair, which is useful to filmmakers when the subject is portraying a character that has facial hair throughout a film. In a superhero film, for example, a bearded superhero may be in scenes that are humanly impossible to film conventionally. Facial performance capture could be performed on the actor portraying that superhero, and the resulting performance sequence and performance facial hair model could be placed in that scene as a "digital double" instead of the actor.

In more detail, one embodiment is directed to a computer-implemented method of generating a reference three-dimensional (3D) facial shape corresponding to a subject. A computer system can retrieve initial subject facial data comprising an initial reference 3D facial shape. The initial 3D facial shape can represent (e.g., visually) the subject and can comprise a plurality of initial reference geometric elements. The computer system can determine a facial hair mask based on the initial subject facial data. The facial hair mask can defined a plurality of probabilities corresponding to the plurality of initial reference geometric elements. Each probability of the plurality of probabilities can indicate that a corresponding initial geometric element represents facial hair. The computer system can determine a plurality of reference facial shape weights corresponding to the plurality of initial reference geometric elements using the facial hair mask. The computer system can generate or retrieve an estimate 3D facial shape. The computer system can generate the reference 3D facial shape by combining the estimate 3D facial shape and the initial reference 3D facial shape. The reference 3D facial shape can comprise a plurality of reference geometric elements and can represent the subject without facial hair.

In some embodiments, the estimate 3D facial shape can comprise a component estimate 3D facial shape. The computer system can generate or retrieve a mean component 3D facial shape and a plurality of component 3D facial shapes. The computer system can use an optimization solver to generate a component estimate 3D facial shape comprising a plurality of component estimate geometric elements. The component estimate 3D facial shape can comprise a weighted combination of the mean component 3D facial shape and the plurality of component 3D facial shapes. The optimization solver can be constrained by a reference facial shape error function relating the plurality of component estimate geometric elements, the plurality of initial reference geometric elements, and the plurality of reference facial shape weights.

Another embodiment is directed to computer implemented method of tracking a facial performance by a subject. The computer system can retrieve or generate a reference three-dimensional (3D) facial shape that represents the subject without facial hair. The reference 3D facial shape can comprise a plurality of reference geometric elements. The computer system can retrieve initial subject facial data including a reference facial frame comprising one or more facial images of the subject, each comprising a plurality of reference pixels. The computer system can retrieve or determine a facial hair mask, which can comprise a plurality of probabilities corresponding to a plurality of facial regions on a face of the subject. Each probability can indicate the probability that facial hair is located within a corresponding facial region. The computer system can retrieve a plurality of facial performance frames corresponding to a facial performance by the subject. Each facial performance frame can comprise one or more facial performance images of the subject each comprising a plurality of performance pixels. The computer system can determine a set of facial hair free reference facial frame using the facial hair mask. The computer system can also determine a set of facial hair free performance pixels using the facial hair mask for each facial performance frame of the plurality of facial performance frames. In this way, the computer system can determine a plurality of sets of facial hair free performance pixels. The computer system can perform a pixel motion estimate process between the set of facial hair free reference pixels and each set of facial hair free performance pixels, thereby determining a plurality of pixel motion estimates corresponding to the plurality of facial performance frames. The computer system can determine a plurality of facial shape transformations corresponding to the plurality of facial performance frames. Each facial shape transformation can corresponds to a facial performance frame of the plurality of facial performance frames. Each facial shape transformation can comprise a facial hair free transformation component and a facial hair transformation component. The facial hair free transformation component can be derived from a corresponding pixel motion estimate of the plurality of pixel motion estimates. The facial hair transformation component can comprise a semi-rigid transformation based on the facial hair free transformation component. The computer system can generate a plurality of performance 3D facial shapes by apply the plurality of facial shape transformations to the reference 3D facial shape. Each performance 3D facial shape of the plurality of performance 3D facial shapes corresponding to a facial performance frame of the plurality of facial performance frames and can comprise a plurality of performance geometric elements.

Another embodiment is directed to a computer implemented method of generating a reference facial hair model that represents facial hair of a subject. A computer system can retrieve initial subject facial data comprising a plurality of facial frames of the subject. Each facial frame can comprise one or more facial images of the subject. The plurality of facial frames can comprise a reference facial frame and a plurality of non-reference facial frames. For each facial frame of the plurality of facial frames, the computer system can perform a facial hair identification process, thereby determining a plurality of initial reference facial hair data elements and a plurality of sets of non-reference facial hair data elements. The plurality of initial reference facial hair data elements and the plurality of sets of non-reference facial hair data elements can represent facial hair of the subject. For each set of non-reference facial hair data elements, the computer system can determine a set of projected non-reference facial hair data elements, thereby determining a plurality of sets of projected non-reference facial hair data elements. The computer system can use an optimization solver to generate a set of alignment transformations for each set of projected non-reference facial hair data elements, thereby determining a plurality of sets of alignment transformations. The optimization solver can be constrained by a facial hair alignment function relating the set of alignment transformations to the set of projected non-reference facial hair data elements. The computer system can apply the plurality of sets of alignment transformations to the plurality of sets of non-reference facial hair data elements, thereby determining a plurality of sets of aligned non-reference facial hair data elements. The computer system can combine the plurality of sets of aligned non-reference facial hair data elements and the plurality of initial reference facial hair data elements, thereby determining a plurality of reference facial hair data elements that represent facial hair of the subject. The reference facial hair model can comprise the plurality of reference facial hair data elements.

Another embodiment is directed to a computer-implemented method of generating a performance facial hair model corresponding to a facial performance by the subject. A computer system can retrieve or generate a reference facial hair model comprising a plurality of reference facial hair data elements. The computer system can retrieve a plurality of facial performance frames corresponding to the facial performance by the subject. Each facial performance frame can comprise one or more facial images of the subject. For each facial performance frame of the plurality of facial performance frames, the computer system can perform an optical flow projection process on the reference facial hair model, thereby determining a set of projected reference facial hair data elements that represent facial hair of the subject, thereby determining a plurality of sets of projected reference facial hair data elements corresponding to the plurality of facial performance frames. For each facial performance frame of the plurality of facial performance frames, the computer system can use an optimization solver to determine a set of reference alignment transformations. The optimization solver can be constrained by a facial hair performance error function relating the set of reference alignment transformations to a corresponding set of projected reference facial hair data elements. In this way, the computer system can determine a plurality of sets of reference alignment transformations. The computer system can apply the plurality of sets of reference alignment transformations to the plurality of reference facial hair data elements, thereby determining a plurality of sets of aligned reference facial hair data elements, wherein the performance facial hair model comprises a plurality of sets of performance facial hair data elements comprising the plurality of sets of aligned reference facial hair data elements.

In addition to other methods described further below, embodiments of the present disclosure are also directed to systems and devices that can be used to execute such methods. For example, one embodiment is directed to a computer system comprising a processor and a non-transitory computer readable medium coupled to the processor, the non-transitory computer readable medium comprising code, executable by the processor for implementing the computer-implemented method of any of the methods described above.

DETAILED DESCRIPTION

Figure 1:
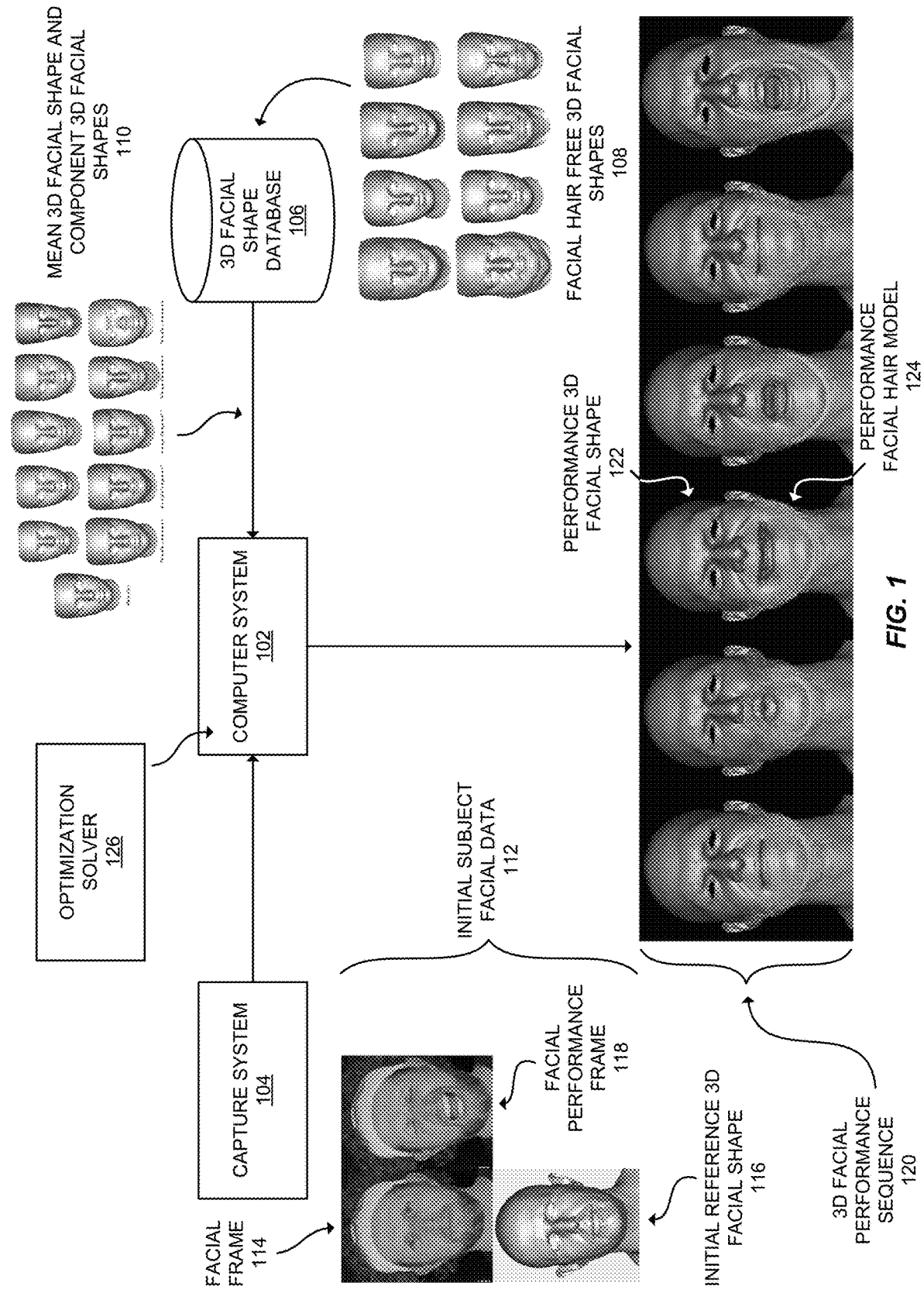
FIG. 1 shows a diagram of an exemplary system that can be used to perform some methods according to embodiments.
Figure 8:
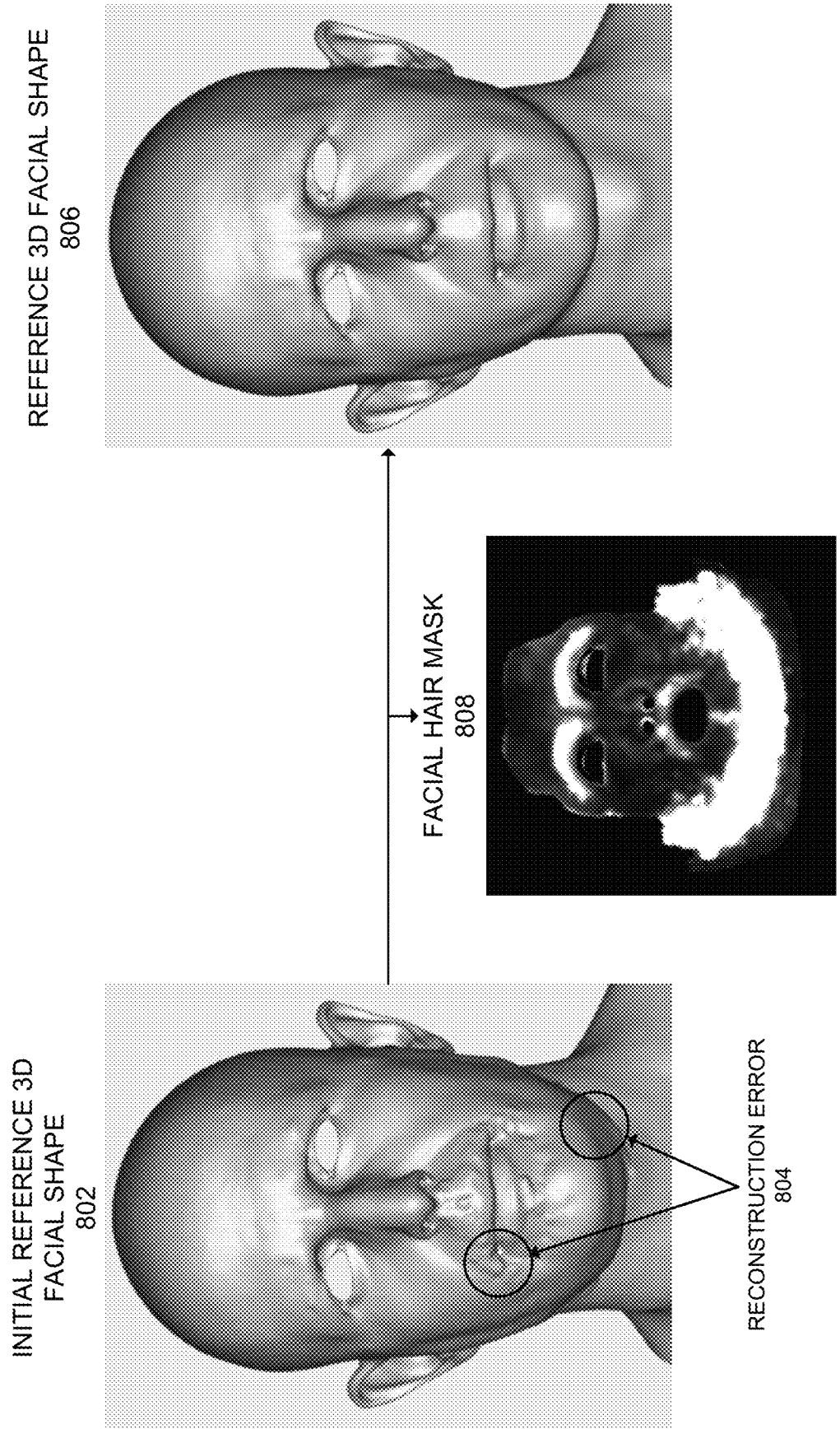
FIG. 8 shows a diagram summarizing the creation of a facial hair mask and a reference 3D facial shape according to some embodiments.

As described above, methods according to embodiments can be performed by a computer system. An exemplary computer system 102 is depicted in FIG. 1, which may be useful for understanding embodiments of the present disclosure. The computer system 102 can interface with a facial capture system 104, such as the Medusa Facial Capture System, which can comprise, for example, a camera array. This capture system 104 can be used to acquire initial subject facial data 112, which can be used by the computer system 102 to perform some methods according to embodiments. These initial subject facial data 112 can include "facial frames" such as facial frame 114. These facial frames can comprise images or multi-view images of a subject, which can be used by the capture system 104, the computer system 102, or some other computer system (not pictured) to generate an initial reference 3D facial shape 116. As shown in FIG. 8, the initial reference 3D facial shape may have reconstruction errors 804 caused by the presence of facial hair on the subject's face, and may not accurately represent the appearance of the subject. Returning to FIG. 1, the initial subject facial data can also include "facial performance frames" such as facial performance frame 118. These facial performance frames can comprise images or multi-view images of a subject during a facial performance, e.g., images of the subject delivering lines of dialog or making expressions.

In addition to this initial subject facial data 112 received from the capture system 104, the computer system 102 can also retrieve a dataset of facial hair free 3D facial shapes 108 from a 3D facial shape database 106. These facial hair free 3D facial shapes 108 can correspond to a variety of clean-shaven individuals. The facial hair free 3D facial shapes 108 can be used to determine (e.g., by the computer system 102), a "mean" 3D facial shape and a plurality of component 3D facial shapes 110. The mean 3D facial shape can represent the average clean shaven individual from the 3D facial shape database 106. As described in more detail below, the component facial shapes can represent common variations in human facial structure, including size, width, etc., and can be determined by principal component analysis.

The computer system 102 can comprise or use an optimization solver 126. This optimization solver 126 can comprise a hardware or software component used to perform mathematical optimization, which can be used in a variety of steps according to methods according to embodiments. For example, in order to accurately estimate the structure of the skin underneath the subject's facial hair, the computer system 102 can use the optimization solver to determine a weighted combination of the mean 3D facial shape and the plurality of component 3D facial shapes 110 that accurately matches the geometry of the subject's face based on the initial reference 3D facial shape 116.

As described in more detail below, the computer system 102 can perform methods according to embodiments using the initial subject facial data 112, and the mean 3D facial shape and the component 3D facial shapes 110 to generate a 3D facial performance sequence 120 corresponding to the facial performance frames 118. In general terms, the 3D facial performance sequence 120 can comprise a plurality of performance 3D facial shapes (e.g., performance 3D facial shape 122), and a performance facial hair model 124, representing the subject's face and facial hair respectively. When rendered and displayed sequentially, the 3D facial performance sequence can accurately visually represent the movement of the subject's face and facial hair during the facial performance captured by the capture system 104.

I. CONCEPTS

As described above, embodiments of the present disclosure relate to 3D modelling and involve the use of mathematical optimization techniques. As such, a working knowledge of 3D modeling, 3D scanning or capture systems (e.g., the Medusa Facial Capture system), and mathematical optimization techniques are useful for implementing embodiments of the present disclosure. It is assumed that any hypothetical practitioner of methods according to embodiments is already familiar with these concepts, and as such they are not described herein in exhaustive detail.

As an example, while it is assumed that a practitioner is (prior to reading this disclosure) unfamiliar with a particular optimization problem such as:

$$\min_{t,q} \lambda_I E_{ICP}(t, q) + \lambda_f E_{flow}(t, q) + \lambda_n E_{neigh}(t, q),$$

it is assumed that this practitioner would be able to use known mathematical optimization techniques to solve this optimization problem upon learning this formulation. That is, a practitioner would be able to determine a reasonable set of minimized "transformations" (t, q) based on the formulation, provided the variables (e.g., 3D translations t and quaternion rotations q) and terms (e.g., the iterative closest points energy term $E_{ICP}(t, q)$) are reasonably well-defined. It is assumed that a practitioner would be able to use any well-known method or software package to determine this solution, e.g., the auto-differentiable Ceres Solver Package [AMO].

However, a practitioner may also be able to solve the above optimization problem (or similar optimization problems) without explicit defining of some terms, variables, or values in the optimization problem. As such, some terms, variables, or values may not be defined in great detail in this disclosure. As an example, if a particular energy term E is well-known, a formula for that term may be omitted. As another example, because of the subjective, artistic nature of 3D modelling, there may not be "correct" values for certain parameters (e.g., the iterative closest point weight $\lambda_{ICP}$). These parameters may affect the aesthetic qualities of facial hair models produced by embodiments of the present disclosure, and different practitioners may prefer different parameters based on these aesthetic qualities. As such, specific values for such weights (e.g., 0.235) may not be disclosed herein.

Nonetheless, some concepts and terminology related to these concepts is describe in broad detail below, in order to facilitate a better understanding of embodiments of the present disclosure.

A. 3D Shapes

Figure 2:
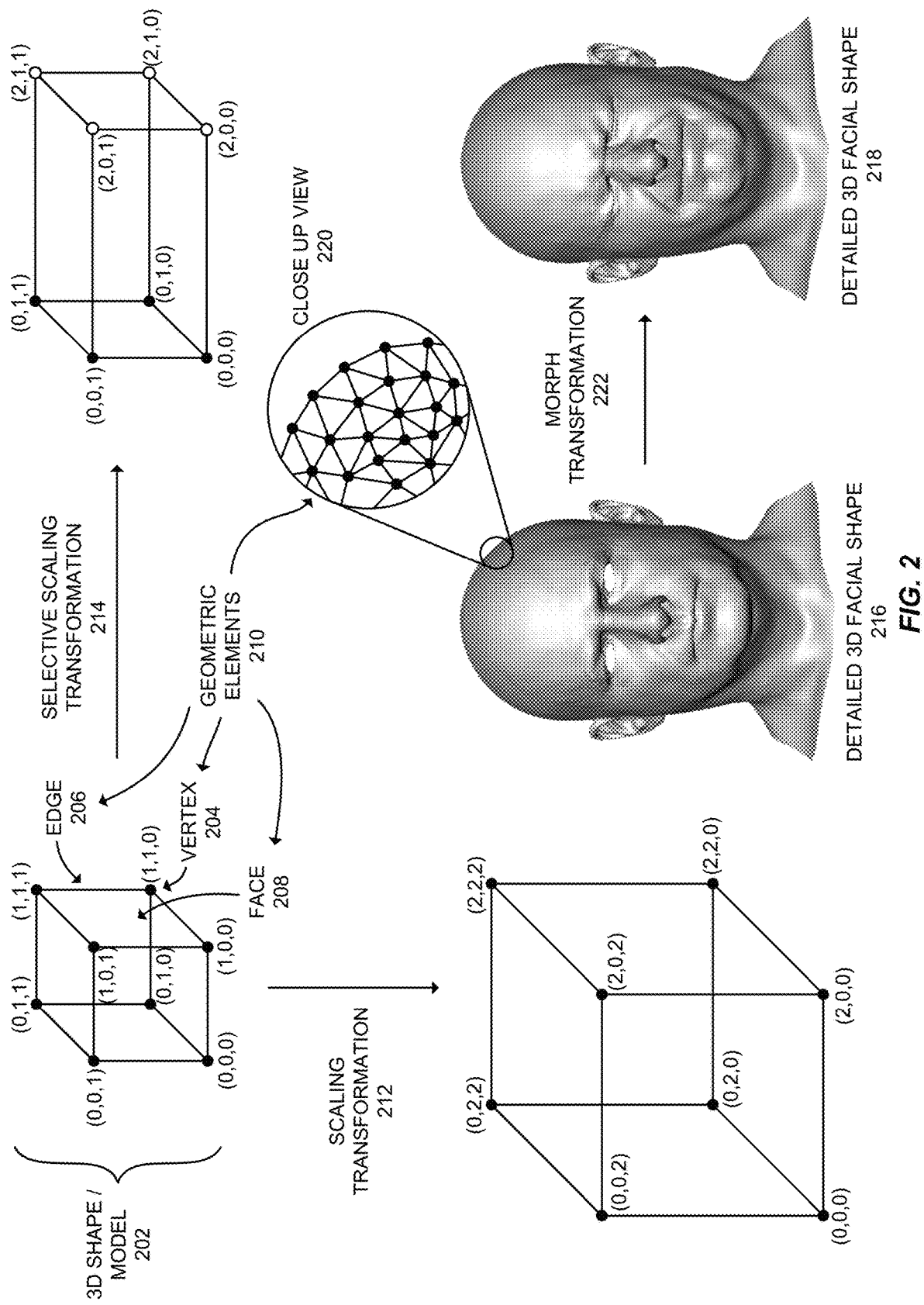
FIG. 2 summarizes some aspects of 3D modelling, which may be useful in understanding embodiments of the present disclosure.

Used herein, the term "3D shape" or "shape" (e.g., "facial shape") generally refers to any data that can be used to represent a three dimensional (3D) object. The more common term "3D model" may also be used. FIG. 2 shows an example of a 3D shape 202 comprising a unit cube. A 3D shape may be stored digitally on a computer memory and may be manipulated using a computer, e.g., by using 3D modelling programs. A 3D shape may comprise "geometric elements," data elements that are representative of geometric features of the 3D shape. FIG. 2 shows geometric elements 210. An example of a geometric element is a "vertex" or "point", a data element that identifies a particular location in space. A vertex can be represented numerically as a tuple or list of coordinates. For example, vertex 204 is represented by the tuple (1,1,0), wherein the first value in the tuple represents an x-axis coordinate of the vertex, the second value in the tuple represents a y-axis coordinate of the vertex, and the third value in the tuple represents a z-axis coordinate of the vertex. A collection of vertices can sometimes be referred to as a "point cloud." As depicted in FIG. 2, 3D shape 202 is a unit cube, represented by a collection of eight tuples [(0,0,0); (0,0,1); (0,1,0); (0,1,1); (1,0,0); (1,0,1); (1,1,0); (1,1,1)].

In some cases, a 3D shape may also have a "topology" that defines relationships between data elements in the 3D shape. This topology can connect or link vertices and their "neighboring" vertices. For example, the vertex (0,0,0) could be connected to vertices (0,0,1); (0,1,0); and (0,0,1) by the topology, but not be directly connected to vertices (1, 1, 1). In some cases, the topology can effectively define the edges of a 3D shape, FIG. 2 shows an exemplary edge 206. The term geometric elements may also refer to such edges.

A 3D shape can define a topology using any appropriate means or data structure. For example, each vertex could be represented by a "data node," which contains both data representative of that vertex (e.g., a tuple of coordinates) and a list of references or "pointers" that point to other data nodes corresponding to other vertices connected to the vertex via the topology. A 3D shape comprising vertices and edges is sometimes referred to as a "wireframe" or "mesh." In this disclosure terms such as "facial mesh", "3D facial model", and "3D facial shape" are used somewhat interchangeably.

A closed loop of points defined by a topology can sometimes be interpreted as a surface or "face" of an object represented by the 3D shape. For example, the collection of connected points [(1,0,0)→(1,1,0)→(1,1,1)→(1,0,1)] can be interpreted as a square face 208 of the 3D shape 202. It is somewhat common in 3D modelling to define topologies that group vertices into triangles, as three vertices are sufficient to define a surface. Less than three vertices are insufficient, and more than three vertices (e.g., four, as described in the example above) may fail to define a surface if those vertices are not co-planar.

A sufficient number of vertices connected in a useful topology can be used to produce 3D shapes of virtually any object, including realistic 3D shapes of human faces. FIG. 2 shows two "renders" (e.g., images of the objects represented by 3D shapes) of detailed 3D facial shapes 216 and 218. Although these 3D facial shapes 216 and 218 appear significantly more complex and detailed than 3D shape 202, they can still comprise geometric elements 210, e.g., as shown in close up view 220. The term facial shape can refer to a 3D representation of anatomy around and including the face, and not just the face itself. For example, as depicted in FIG. 2, detailed 3D facial shapes 216 and 218 also correspond to the neck and shoulder region of a subject.

A "transformation" may refer to an operation that can be performed on a 3D model or a subset of geometric elements in a 3D model, thereby transforming it. One example of a transform is scaling, by which the size of a 3D model is changed by modifying the location of the vertices without affecting the topology. For example, scaling transformation 212 can be accomplished by multiplying each coordinate in each vertex of 3D shape 202 by 2. Scaling transformation 212 can result in a 3D shape that is eight times as voluminous as 3D shape 202, and can be represented by the list of vertex tuples [(0,0,0); (0,0,2); (0,2,0); (0,2,2); (2,0,0); (2,0,2); (2,2,0); (2,2,2)]. Alternatively, an exemplary selective scaling transformation 214 can be applied to a subset of vertices in 3D model 202 (or alternatively a subset of coordinates, e.g., the x-coordinates) to produce a 3D shape that is twice as long along the x-axis. Other examples of transformations include translation (i.e., movement of geometric elements such as vertices in space), and rotation.

By combining multiple transformations, it is possible to manipulate 3D shapes in a large variety of ways. Many 3D modelling programs provide user abstractions to enable 3D artists to manipulate 3D shapes using transformations. For example, "deformation handles" can be applied to collections of vertices in a 3D shape, and enable users to "pull" or "push" such handles to reposition the vertices, thereby transforming the 3D shape and its appearance. As another example, a "rigging" or "skeleton" enables 3D artists to manipulate 3D shapes in a similar manner. For example, a 3D shape representative of a humanoid figure can be rigged to enable a 3D artist to lift the figure's right leg (and all attached geometric elements, e.g., corresponding to the figure's right foot) in a manner that is anatomically plausible.

It is possible for multiple 3D shapes to have or "share" the same model topology, despite otherwise being different models. For example, detailed 3D facial shape 216 and detailed 3D facial shape 218 can share the same topology despite being different 3D shapes. Two 3D shapes that share the same topology may be described as "in correspondence." When two 3D shapes are in correspondence, for each vertex in one 3D facial shape (e.g., detailed 3D facial shape 216), there may be a corresponding vertex in the other 3D facial shape (e.g., detailed 3D facial shape 218). Optionally, 3D shapes may have a common or "canonical" coordinate frame. In a broad sense, this means that a particular location in 3D space (e.g., (5, 2, 1)) is the same or has the same meaning for all 3D shapes that share that canonical coordinate frame.

It may be possible (e.g., provided the 3D shapes share a coordinate frame and a common topology) to define a transformation that can be used to transform complex or detailed 3D shapes into one another. For example, a "morph" transformation 222 can be used to transform detailed 3D facial shape 216 into detailed 3D facial shape 218. Because the two detailed 3D facial shapes are in correspondence, this transformation can be accomplished by translating and/or rotating each vertex in detailed 3D facial shape 216 to the location of the corresponding vertex in detailed 3D facial shape 218.

As a result, it is possible to define or describe 3D shapes in terms of a "3D reference shape" (or just "reference shape") and one or more transformations. For example, it may be possible to define a 3D shape representing a trapezoid prism in terms of a 3D shape representing a cube and a transformation. When the transformation is applied to the cube, the resulting 3D shape can comprise the trapezoid prism. This property may be particularly useful for facial shapes. For example, detailed 3D facial shape 216 (which shows a "neutral" expression) can be treated as a reference facial shape, and other facial shapes (e.g., detailed 3D facial shape 218, which shows a "squinting" expression), can be represented or modeled as a morph transformation 222 applied to the reference facial shape.

Another useful transformation can be referred to as "blending." In a blending transformation, two or more 3D shapes can be combined to produce another 3D facial shape. For example, detailed 3D facial shape 216 and detailed 3D facial shape 218 could be combined to produce another 3D facial shape. Such a facial shape could represent an "average" of the neutral expression of detailed 3D facial shape 216 and the squinting expression of detailed 3D facial shape 218, which could visually represent a less intense squinting expression. This could be accomplished, for example, by averaging the coordinate values corresponding to each vertex in detailed 3D facial shape 216 with corresponding coordinate values in detailed 3D facial shape 218.

This blending transformation can be used to define a 3D shape in terms of linear (or even non-linear) combinations of any number of other 3D shapes. For example, a 3D facial shape could be defined in terms of five other facial shapes and five "weight values" corresponding to those other facial shapes. The greater the weight value (relative to the other weight values), the more similar the 3D facial shape may be to a corresponding other facial shape. This can be particularly useful to 3D artists that are trying to model specific expressions using 3D facial shapes. A 3D artist could, for example, have pre-made facial shapes corresponding to expressions for "excitement," "fear," and "anger." The 3D artist could then use these three 3D facial shapes to define another 3D facial shape (via blending) that expresses all three of these emotions, e.g., a character expressing "anxiousness." These excitement, fear, and anger 3D facial shapes can be referred to as "blendshapes" or "morph targets" in different 3D modelling programs. Such modelling programs can provide user interfaces and other support for combining 3D shapes in the manner described above.

B. Facial Hair Model

Figure 3:
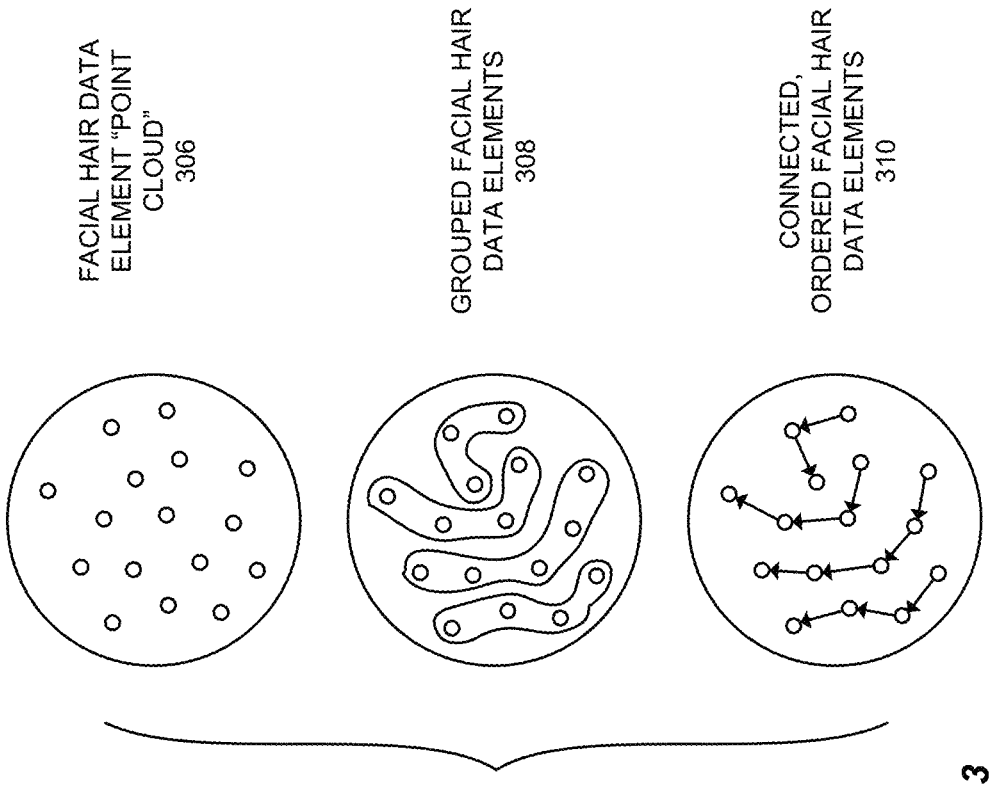
FIG. 3 shows a performance 3D facial model and a corresponding performance facial hair model, in addition to some exemplary representations of facial hair data elements.
Figure 3:
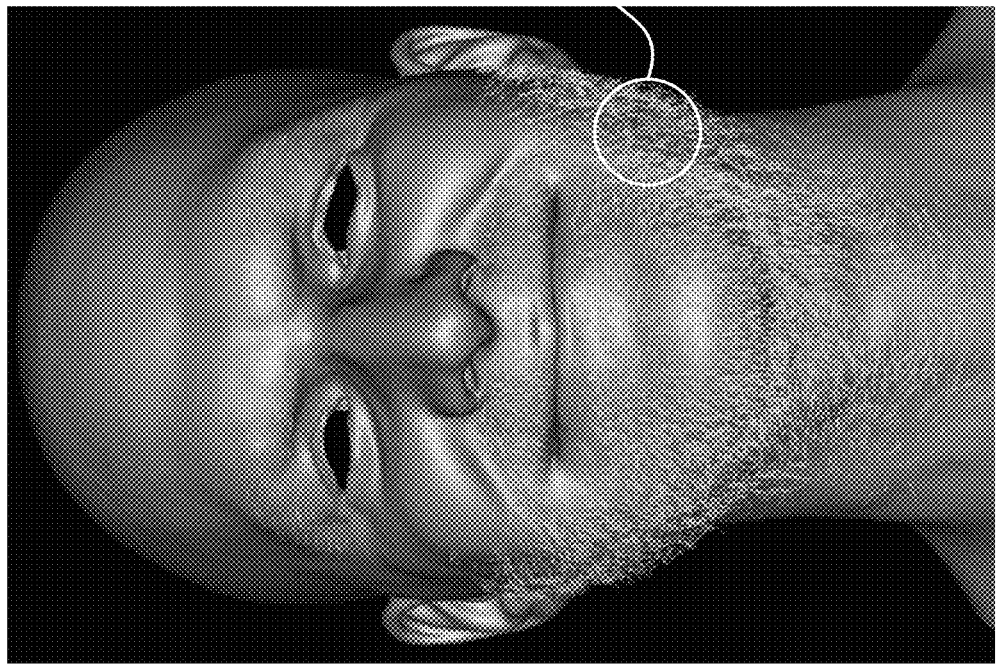

Used herein, a "facial hair model" generally refers to any data that can represent facial hair of a subject. A facial hair model can comprise a set or plurality of "facial hair data elements." FIG. 3 shows a render of performance 3D facial model and a corresponding performance facial hair model 302, which can correspond to a performance frame of a facial performance by the subject. FIG. 3 also shows a variety of exemplary representations of facial hair data elements 304. As one example, facial hair data elements can be represented as a "point cloud" 306, which can comprise an unconnected set of points or vertices (represented, e.g., by coordinate tuples) generally representative of the subject's facial hair. As another example, grouped facial hair data elements 306 can comprise points in a point cloud which have been grouped, e.g., into groups representing individual hairs. Yet another example of facial hair data elements are connected, ordered facial hair data elements 310. In this case, individual facial hair points can be connected to other facial hair points (e.g., by directed edges) and these chains of points can represent individual facial hairs. Data nodes representing each facial hair point can contain a "pointer" or other data connecting these facial hair points together. Such connected, ordered facial hair data elements can be rendered by interpolating between connected points to form lines, assigning a thickness or radius to each line, thereby generating 3D shapes corresponding to each hair, then rendering the resulting 3D shapes.

There are a large variety of ways that facial hair can be represented using facial hair data elements, The exemplary representation of facial hair data elements 304 were provided only as a brief list of examples in order to better understand embodiments of the present disclosure. Other representations of facial hair data elements or techniques for representing facial hair data elements may become apparent upon reading this disclosure. In some cases, it may be preferable to model facial hair in different ways depending on any particular operations performed on those facial hair elements. For example, when determining an iterative closest points energy term $E_1$ (used to constrain an optimization solver) it may be preferable to represent the facial hair data elements as a point cloud 306. Later, when rendering the facial hair data elements, it may be preferable to represent the facial hair data elements as a connected ordered sequences of facial hair points 310.

C. Capture

"Capture" generally refers to processes used to generate one or more 3D shapes of a subject, such as an actor or actress. A "facial capture" may refer to a process used to generate one or more 3D models of a subject's face (and surrounding anatomy). A "performance capture" (e.g., a "facial performance capture"), typically refers to a capture used to generate 3D shapes corresponding to a performance by a subject (e.g., an actress or actor delivering lines of dialog). Capture may also be referenced using related terms such as "actor scanning." Capture is often accomplished using one or more images or videos taken of the subject, although laser-based (or other) capture systems are also possible. A system such as the Medusa Facial Performance Capture System or the Anyma Performance Capture system can be used to perform capture.

Figure 4:
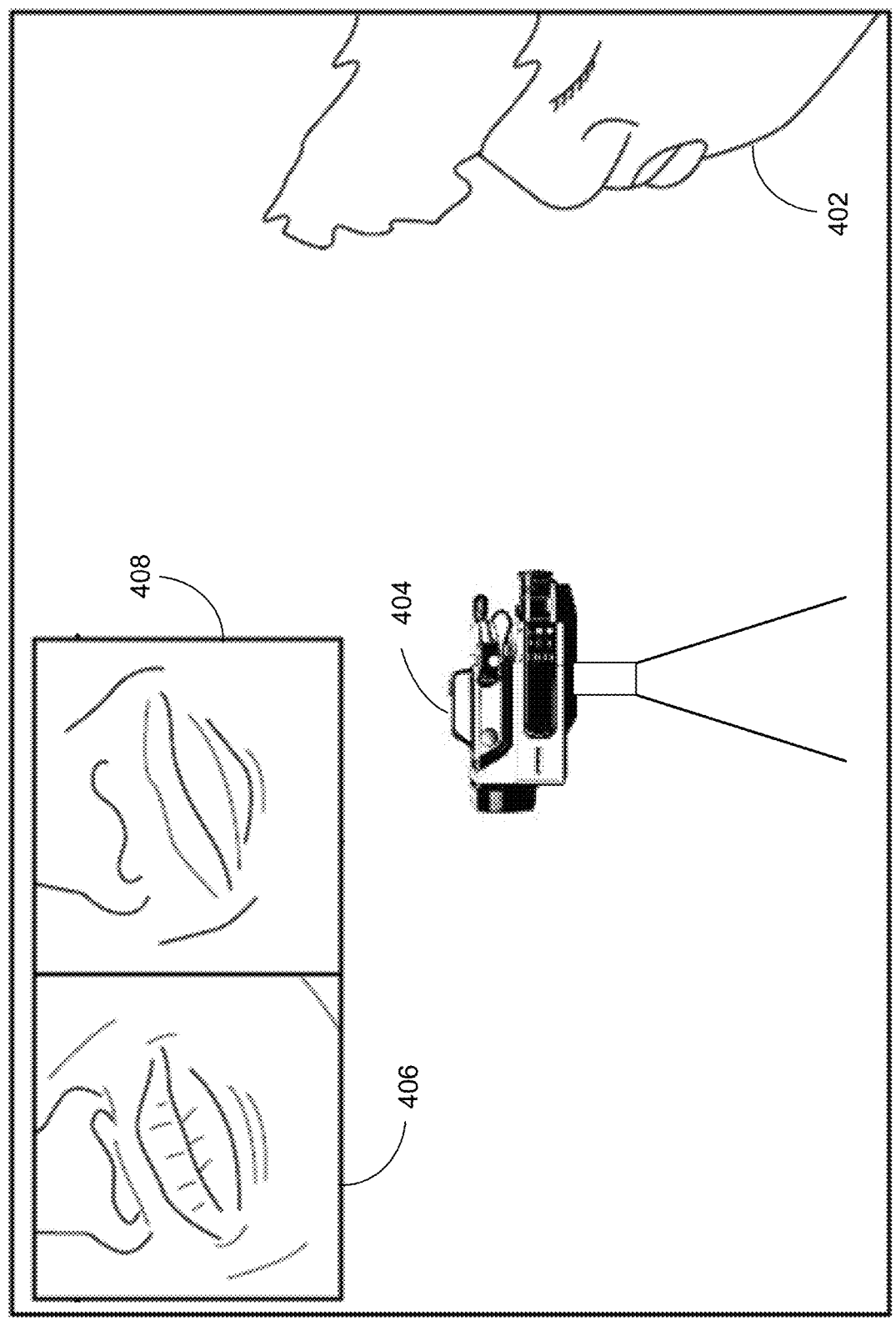
FIG. 4 shows a diagram of an exemplary facial capture environment according to some embodiments.

FIG. 4 shows an example of an environment that includes a system for collecting images of a subject 402 and perform facial performance capture. 2D and 3D data (including motion data) may be determined from the collected images. Alternatively or additionally, motion data may also be determined from markers attached to the face of the subject 402, from an illustration (or other artwork) created by an artist, or from another suitable source. In some cases, 3D performance capture can be performed using a single point of view (e.g., from a camera view of a camera 404), in which case monocular facial capture may be performed. In other cases, data may be obtained from multiple points of view (e.g., multiple cameras), in which case multi-view face capture may be performed. Using the set-up shown in FIG. 4, the subject can make a facial expression 406 that is captured in an image from the camera 404. Motion data can be determined from the image, using, for example, optical flow techniques. Using the motion data, a facial performance capture program running on a computer system can perform methods to generate an output 408, which can comprise a reconstructed representation of the subject's facial expression (e.g., a 3D subject facial shape).

Figure 5:
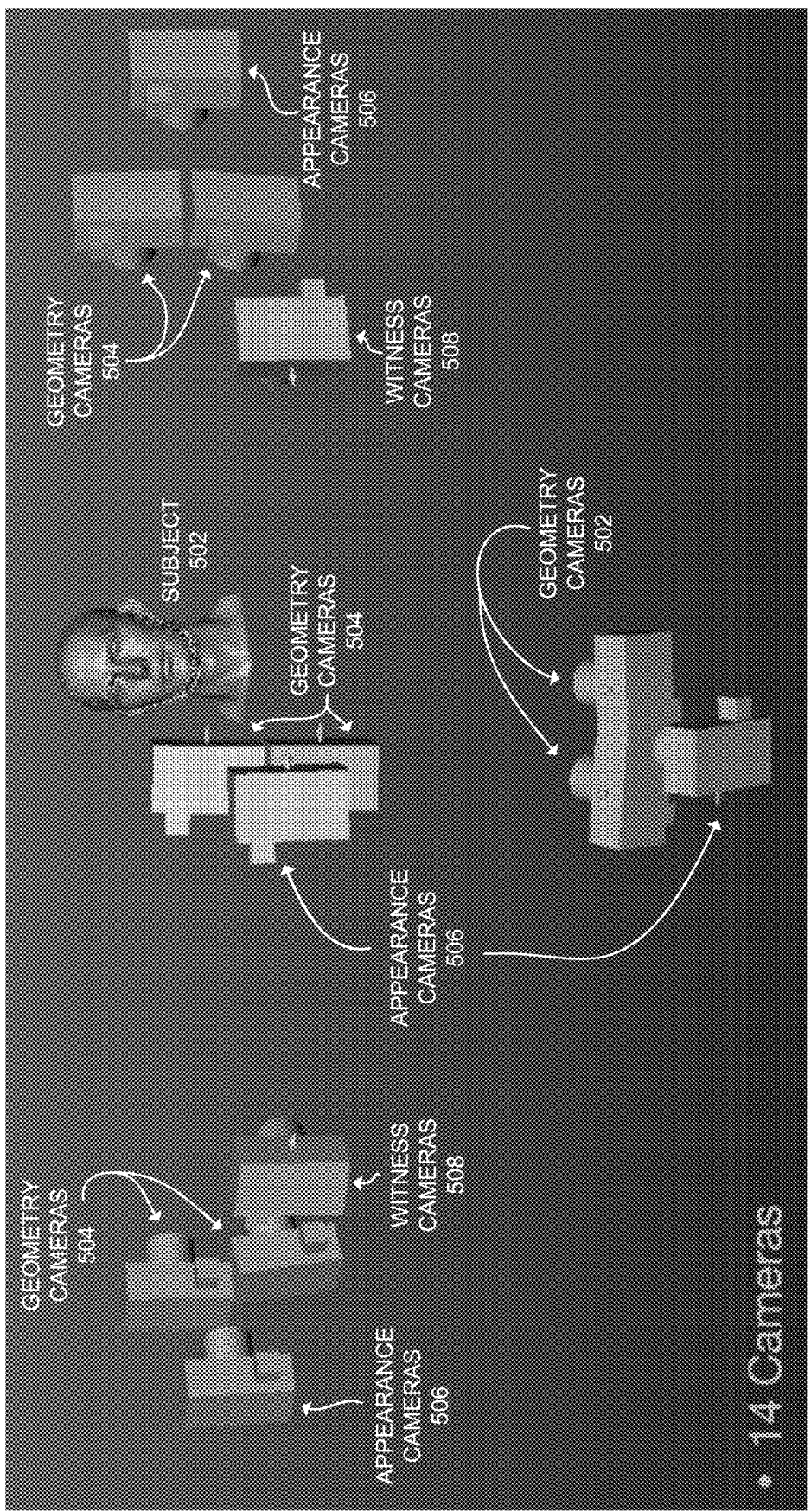
FIG. 5 shows an exemplary multi-camera array that can be used to perform facial performance capture.

Embodiments of the present disclosure can make use of a multi-view facial capturing system, such as the exemplary multi-view facial capturing system 500 of FIG. 5. This system 500 can be used to perform a facial capture or facial performance capture on a subject 502, and can comprise fourteen cameras in total. These fourteen cameras can include eight geometry cameras 504 positioned in pairs of two. The geometry cameras 504 can be positioned directly facing, below, and to the left and right of the subject 502. In one particular implementation of the multi-view facial capturing system 500, the geometry cameras 504 can comprise 12 MP Ximea xiB CB120CG-CM cameras with 80 mm lenses. The fourteen cameras can also include four appearance cameras 506 positioned between each of the geometry camera 504 pairs. In one particular implementation of the multi-view facial capture system 500, the appearance cameras 506 can comprise 48 MP Ximea XiB CB500CG-CM cameras with 135 mm lenses. The appearance cameras 506 can be cross polarized. The fourteen cameras can also include two witness cameras 508, placed between the frontal and side views. The witness cameras may be used for facial hair reconstruction, and in some embodiments may not be used for capturing any initial facial shapes of the subject 502. In one particular implementation of the multi-view facial capture system 500, the witness cameras 508 can comprise 18 MP xiB CB160CG-CM cameras with 100 mm lenses. The subject 502 can be illuminated using any appropriate light source, such as any number (e.g., 12, 24, 72, etc.) of polarized horizontal LED strips. In some cases, uniform lighting and low shadows may be preferable for accurate facial capture. The fourteen cameras in the multi-view facial capture system 500 may capture video at any appropriate frame rate, e.g., 24, 48, 60, etc. frames per second.

As stated above, it is assumed that any potential practitioners of embodiments of the present disclosure generally have the skills and knowledge to implement or perform 3D capture, including facial capture. As such, the operation of a capture system (such as multi-view facial capture system 500) and the mechanics of its operation are not described in great detail herein. Moreover, there are a considerable variety of techniques and methods that can be used to perform capture, and as such it is not feasible to describe every possible capture method in great detail.

In general however, 3D facial capture involves using image and video data of a subject to estimate the geometry of that subject's face. Data elements such as pixels can be used for this purpose. For example, three cameras can each capture an image of the side of the subject's face from different angles. It may be possible to use image processing techniques to identify a set of pixels that correspond to the same parts of the subjects face in each of the three images, such as a set of pixels corresponding to part of the subject's jawline. Because each of the cameras is positioned at different angles and at different distances, this set of pixels may have a different shape in each image. Because the positioning and angle of the cameras are known, it is possible to determine the effect of changing position and angle on the set of pixels, which enables the estimation of the 3D structure (e.g., the jawline) represented by those pixels. Spherical objects, for example, are relatively invariant to angle of observation, and pixels representative of spherical objects may not change much when the camera angle changes. Pointed objects, by contrast (e.g., a subject's nose) may be highly sensitive to changes in camera angle. By observing and correlating pixels from multiple camera angles and corresponding to the entirety of the subject's face, it is possible to generate a 3D facial shape that accurately represents the subject's face (excluding facial regions that may be occluded by facial hair).

Related to capture is a process referred to as "tracking" or "propagation." While an individual facial capture operation generally involves using images of a subject to produce a 3D facial shape corresponding to that subject, tracking (e.g., "performance tracking") can involve transforming a 3D facial shape so that it matches images of a subject. After a reference 3D facial shape is generated using capture, tracking can be used to model a facial performance by the subject, e.g., as a "performance sequence" comprising a chronologically ordered set of performance 3D facial shape. Each performance 3D facial shape can correspond to a performance frame of a video sequence, such as a video recording of the subject performing (e.g., delivering lines of dialog).

Like facial capture, it is assumed that a potential practitioner of embodiments of the present disclosure is familiar with tracking. As such, method of performing performance tracking are not described in great detail herein. More detail on performance tracking can be found in the references, e.g., [BHB+11]. As a high-level summary, it is possible to analyze facial performance frames in order to determine facial shape transformations, which can be used in the tracking process. By applying these facial shape transformations to a reference 3D facial shape (e.g., depicting the subject's face at a resting or neutral position), it is possible to transform the reference 3D facial shape such that it mimics the appearance of the subject in each performance frame. In slightly more detail, a computer system can analyze the pixels in a reference frame of the subject and in a particular performance frame. From this, it is possible to determine corresponding pixels, e.g., pixels corresponding to the same sections of the subject's face. Optical flow techniques can be used to determine pixel motion estimates, which can comprise models detailing the movement of such pixels between the reference frame and the performance frame. These pixel motion estimates can be used to derive 3D facial shape transformations, which can then be used to transform the reference 3D facial shape.

D. Optimization

Used herein, "Optimization" (sometimes referred to as "mathematical optimization") generally refers to the process of determining a set of parameters which satisfies some conditions, usually represented functionally or formulaically. For example, as depicted in FIG. 6, an expression such as $$\text{"}\min_{\alpha} \lambda_{pos}^{(b)} E_{pos} + \lambda_{ICP}^{(b)} E_{ICP} + \lambda_{reg}^{(b)} \|\alpha\|^2\text{"}$$

can generally be interpreted as "determine values of the set of target parameters 604 α (e.g., weights defining a combination of component facial shapes, as described in more detail below) that minimizes the value of the error function 602 $\lambda_{pos}^{(b)} E_{pos} + \lambda_{ICP}^{(b)} E_{ICP} + \lambda_{reg}^{(b)} \|\alpha\|^2$". In broad terms, error functions such as 602 generally relate the actual performance of a system to its expected, idealized, or preferred performance. Used herein, different error functions may be distinguished by names, e.g., error function 602 may be referred to as a "reference facial shape error function", as the parameters α may be used (somewhat indirectly, as described in more detail below) to derive a 3D reference facial shape. Error functions are often designed or formulated such that the value of the error function is zero (or approaches zero) when ideal performance is achieved, and the value of the error function increases as performance worsens.

A error function can comprise multiple "energy terms," such as energy term 608. Often, the error function can comprise a weighted sum of these energy terms. For example, as depicted in FIG. 6, positional energy term 608 is multiplied by weight 606 and summed with two other weighted energy terms in error function 602. Each energy term can itself be a function, based on some aspect of ideal or desired performance of a system. For example, the positional energy term 608 can comprises a squared positional difference between geometric elements (vertices) representative of an "initial reference 3D facial shape" 612 and geometric elements (also vertices) representative of a "component estimate 3D facial shape" 614. This squared positional difference can be multiplied by per-vertex weights 610.

Figure 6:
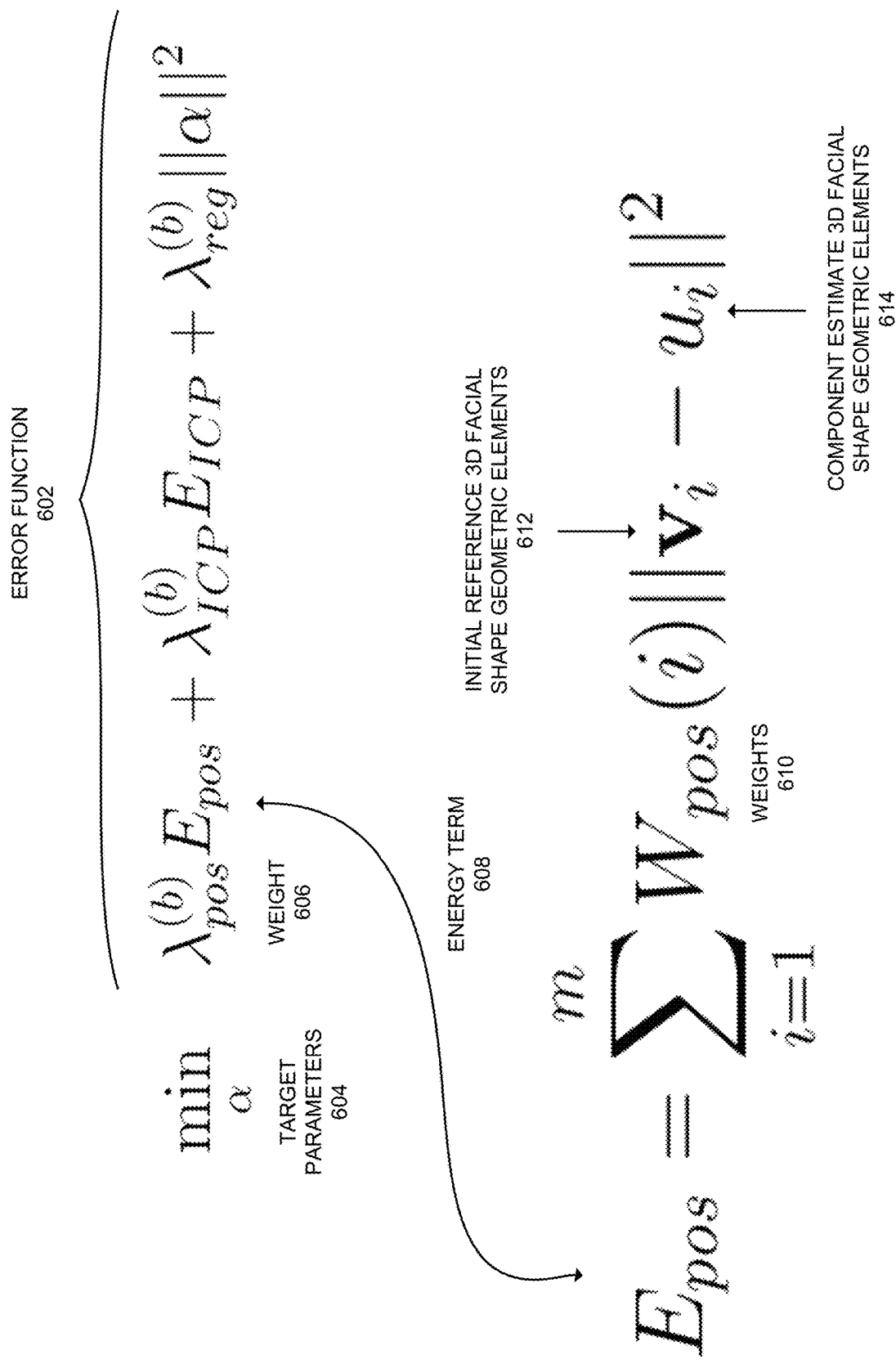
FIG. 6 shows an error function and related energy term.

An "optimization solver" can refer to a hardware component, software application, software routine, etc., which can be used to solves optimization problems, such as the optimization problem depicted in FIG. 6. Such an optimization solver can be said to be "constrained" by error function 602, in that error function 602 constrains or determines the set of target parameters 604 produced by optimization solver. The positional energy term 608, defining a formulaic relationship between the initial reference geometric elements 612, the component estimate geometric elements 614, and the weights 610 can be said to "relate" the initial reference geometric elements 612, the component estimate geometric elements 614, and the weights 610. Likewise, because the reference facial shape error function 602 contains the positional energy term 608, the reference facial shape error function 602 can be said to relate the initial reference geometric elements 612, the component estimate geometric elements 614, and the weights 610.

The act of optimizing, (i.e., determining the set of parameters that e.g., minimize an error function) can be accomplished using an number of optimization methods, including non-linear optimization methods such as Gauss-Newton, Levenberg-Marquardt, Nelder-Mead, BFGS, etc. There are a variety of available open source software packages and libraries for performing such optimization (e.g., the Ceres Solver [AMO]). It is assumed that a practitioner is capable of implementing such optimization methods, and as such, the execution of specific optimization methods are not described in detail herein. As a broad summary, such optimization methods can involve determining an initial parameter estimate $p_0$ (e.g., $\alpha_0$), then in successive "rounds", "steps", or "stages", the value of the error function is evaluated (for the current parameter estimate $p_k$, which initially is $p_0$) and the parameter estimate is updated to $p_{k+1}$ with the goal of reducing the value of the error function. Eventually, the value of the error function is expected to converge, at which point the optimization process is complete, resulting in the determination of a final parameter estimate p. For many optimization problems, it may be impossible to determine a set of parameters p corresponding to the true global minima of the error function. Often optimization methods are used to find parameters that correspond to a local minima that are suitable for the particular application of the optimization problem, i.e., parameters that are "good enough." In the context of facial performance capture, such parameters may produce (directly or indirectly) 3D facial shapes that meet some subjective aesthetic quality requirement of practitioners of methods according to embodiments, e.g., parameters that produce 3D facial shapes that the practitioner believes realistically represent a subject.

II. METHODS

A. Overview

Figure 7:
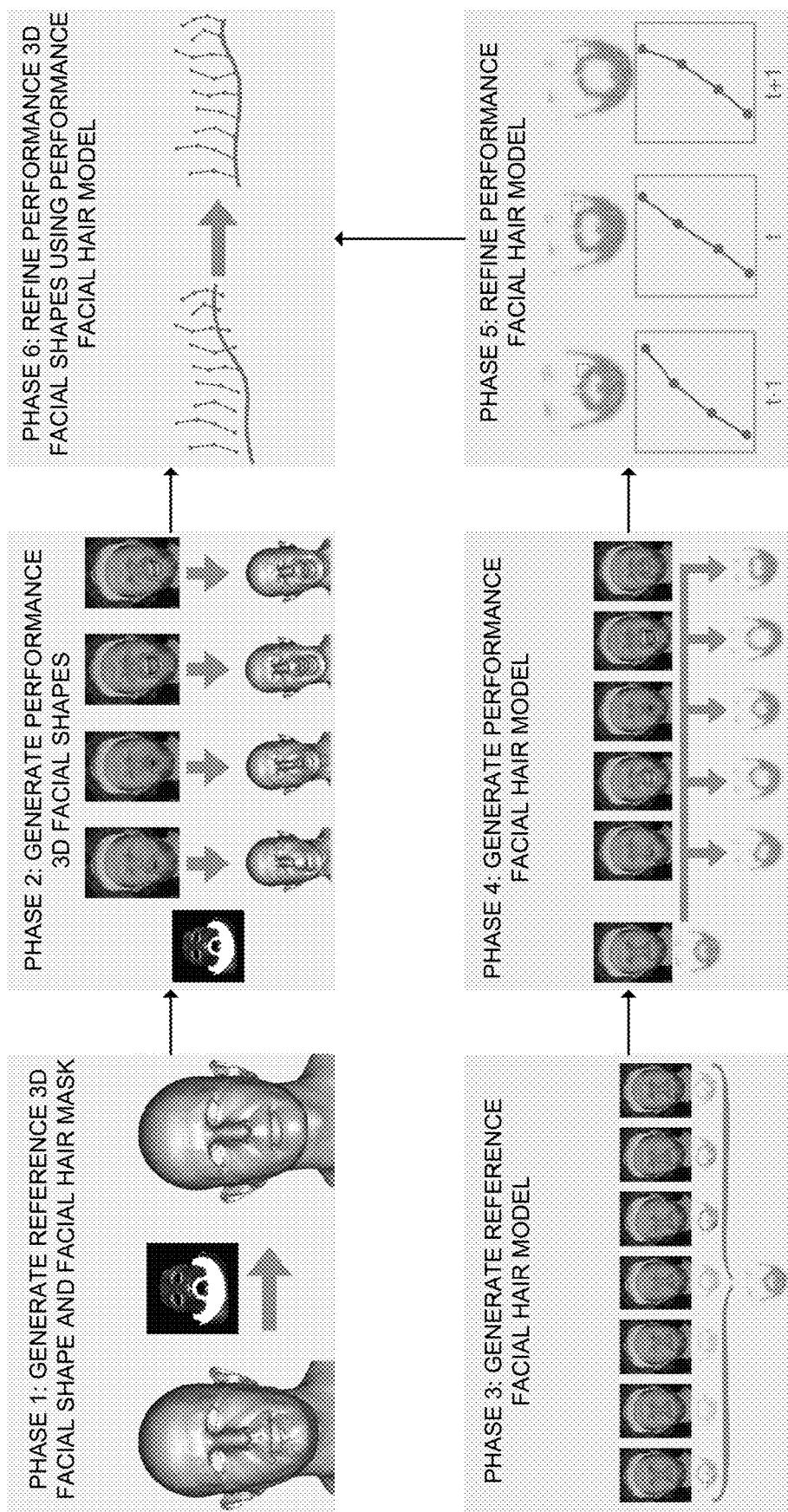
FIG. 7 shows a diagram detailing a six phase pipeline according to some embodiments.

As described above, methods according to embodiments of the present disclosure can generally be understood with reference to a "pipeline" comprising six phases. FIG. 7 shows a diagram summarizing these six phases. As depicted in FIG. 8, in Phase 1, a computer system can use an initial reference 3D facial shape 802 to generate a reference 3D facial shape 806 and a facial hair mask 808. The initial reference 3D facial shape 802 can be captured using a facial performance capture system and can represent a face of a subject (e.g., an actor or actress). The initial reference 3D facial shape 802 can have reconstruction errors 804 as a result of the subject's facial hair.

In Phase 1, the computer system can generate the facial hair mask 808 (identifying regions of the subject's face that are likely covered by facial hair) along with the reference 3D facial shape 806, which can represent the face of the subject without facial hair. The reference 3D facial shape can comprise a plurality of "reference geometric elements" (e.g., vertices). The computer system can use a database of clean shaven facial shapes of a variety of individuals to generate a "estimate 3D facial shape" (sometimes a "component estimate 3D facial shape) that accurately estimates the structure of the subject's face underneath their facial hair. This component estimate facial shape can be combined with the initial reference facial shape (which can accurately represent "facial hair free" regions of the subject's face) to produce the reference 3D facial shape. While the reference 3D facial shape 806 (and the facial hair mask 808) may be useful to filmmakers on its own, it may also be used in subsequent phases of the pipeline.

Returning to FIG. 7, in Phase 2, the computer system can use the reference 3D facial shape and facial hair mask in order to generate a performance sequence corresponding to a facial performance by the subject. This performance sequence can comprise a plurality of performance 3D facial shapes, each corresponding to a particular video frame of a recorded facial performance. Summarily, the computer system can use the facial hair mask to identify pixels in the performance sequence that are not covered by facial hair (i.e., "facial hair free performance pixels") as well as pixels in a reference frame that are not covered by facial hair (i.e., "facial hair free reference pixels"). Using performance tracking techniques (e.g., those described in [BHB+11]), the computer system can track the motion between the facial hair free reference pixels and the facial hair free performance pixels.

These pixel motion estimates can be used to generate "facial shape transformations" that can be used to transform the reference 3D facial shape to match the expression of the subject in each facial performance frame. Each facial shape transformation can comprise a "facial hair free transformation component" and a "facial hair transformation component." The facial hair free transformation component can define a transformation on the reference geometric elements that are not representative of facial hair (e.g., geometric elements representing the nose, forehead, etc., of the subject). The facial hair transformation component can define a transformation on the reference geometric elements corresponding to facial regions covered by facial hair (e.g., geometric elements representing the chin, jawline, below the nose, etc.). The facial hair transformation components can comprise semi-rigid or "rigid as possible" deformations based on the facial hair free transformation component. By applying the facial shape transformations to the reference 3D facial shape, the computer system can generate a plurality of performance 3D facial shapes corresponding to the facial performance by the subject.

In Phase 3, the computer system can generate a reference facial hair model. The reference facial hair model can comprise a plurality of reference facial hair data elements (e.g., as described above with reference to FIG. 3) representative of the subject's facial hair. A number of facial frames, including a "reference facial frame" and a plurality of "non-reference facial frames" can be captured, e.g., corresponding to a small head rotation by the subject. Each facial frame can comprise one or more images of the subject. Using a facial hair detection process, facial hairs can be detected in each facial frame. Facial hairs detected in the reference facial frame can be represented by "reference facial hair data elements." Facial hairs detected in the non-reference facial frame can be represented by "non-reference facial hair data elements." In broad terms, sets of non-reference facial hair data elements can be aligned with the reference frame and combined with the reference facial hair data elements in order to "build up" a complete reference facial hair model.

In Phase 4, the computer system can generate a performance facial hair model by propagating the reference facial hair model to the plurality of performance facial frames. This process is similar to how the reference 3D facial shape was propagated to a plurality of facial performance frames to generate the plurality of performance 3D facial shapes (e.g., at Phase 2). The performance facial hair model can generally represent the movement of the subject's facial hair during a facial performance by the subject (captured in a plurality of facial performance frames). In broad terms, the computer system can use optical flow techniques to project reference facial hair data elements from the reference facial hair model to each performance facial frame. Then using an optimization solver constrained by a "facial hair performance error function", the computer system can align the reference facial hair data elements with each facial performance frame. These aligned facial hair data elements can comprise the performance facial hair model.

In Phase 5, the computer system can perform a refinement process in order to improve the performance facial hair model. This refinement process can comprise a non-rigid space-time hair refinement process, in order to better match the performance facial hair data elements to the deformation of the facial hairs shown in each respective facial frame. In crude terms, this refinement process enables the performance facial hair model to model the bending of facial hairs during the facial performance, rather than modelling the facial hairs as being stiff or rigid collections of facial hair data elements. The computer system can use an optimization solver to minimize a non-rigid space-time error function relating to a deformation of each performance facial hair data element of the performance facial hair model in order to perform this refinement process.

In Phase 6, the computer system can refine the performance 3D facial shapes using the performance facial hair model. In general terms, the computer system can use the movement of the facial hair (based on the performance facial hair model) to improve the modelling of the skin underneath that facial hair (as represented by the performance 3D facial shapes). Facial regions can be defined on the reference 3D facial shape and the performance 3D facial shapes, e.g., using "landmarks" or "deformation handles." These can comprise, e.g., circular regions located on areas typically covered by facial hair. Facial hair data elements from the reference facial hair model and the performance facial hair model, which correspond to these regions, can be determined. These facial hair data elements can correspond to facial hairs that would be located within these regions on the subject's face.

The computer system can determine facial hair transformations relating facial hairs located on a region (e.g., the chin) in the reference facial hair model and facial hairs located in a corresponding region in the performance facial hair model. These facial hair transformations can generally describe how those facial hairs move during the facial performance. These facial hair transformations can be applied to the reference regional geometric elements in the defined regions to produce transformed reference regional geometric elements. These transformed reference regional geometric elements model the deformation of the skin surface based on the known deformation of the facial hairs during the facial performance. The computer system can use an optimization solver to minimize a refined performance error function, which can relate the transformed reference regional geometric elements to the existing performance 3D facial shapes to generate refined performance 3D facial shapes, effectively refining the performance 3D facial shapes based on the performance facial hair model.

It should be understood that the specific ordering of steps and phases described herein are intended to facilitate a better understanding of embodiments of the present disclosure, and are not intended to be limiting. In many cases, it is possible to omit one or more steps or phases, perform those steps or phases out of order, or otherwise deviate from the six phase structure described above and still achieve a useful result.

For example, Phases 1 and 2 can be performed in order to generate reasonably accurate, clean shaven performance 3D facial shapes corresponding to the subject. While it may be useful to additionally model the subject's facial hair (e.g., in Phases 3-5) or further refine the refined facial performance data (e.g., in Phase 6), conceivably, refined facial performance data could be used in a film production as-is. For example, if an actor's character is bearded throughout most scenes in a film, but is not bearded in a flashback scene, the refined facial performance data could be used to represent that character in that scene, while live action acting could be used in other scenes. As such, it should be understood that methods according to embodiments are not directed to performing the six phases summarized above in exactly the order described, but can instead be understood with reference to these steps and phases. In the following sections, these phases and steps comprising these phases are described in greater detail.

B. Initialization Phase

"Initialization" generally refers to any steps performed prior to the six phase pipeline described above. These can include steps to set up a capture array, such as establishing camera pose (e.g., the position and orientation of cameras in the capture array), color and lighting calibration, etc. It can also include steps associated with performing an initial facial capture and facial performance capture on the subject, which can be used to produce the "initial subject facial data" used in methods according to embodiments. Because methods according to embodiments are generally directed to methods involving the use of such initial subject facial data, rather than its acquisition, the initialization phase is not described in much detail herein.

In summary, during the initialization phase, a facial performance capture system can be used to perform facial capture on a subject. This can include capturing a plurality of "facial frames" and "facial performance frames" of a subject. Used herein, a "frame" generally refers to one or more images of something, e.g., a facial frame can comprise one or more images of a subject's face. If the facial performance capture system comprises a multi-view camera array, a frame can comprise an image corresponding to each camera at a particular moment in time. For example, if a facial performance capture system comprises an array of 10 cameras, a facial performance frame could comprise 10 images of the subject captured by the camera array at the same time during the subject's facial performance. The initial subject facial data may include these facial frames and facial performance frames, and the computer system can use this initial subject facial data (e.g., during the phases described below), in order to generate the reference 3D facial shapes, performance 3D facial shapes, reference facial hair model, and performance facial hair model in subsequent phases.

The initialization phase can also involve a process referred to as "raw mesh reconstruction," which can be achieved using method such as those disclosed in [BBB+10] and [BHB+11]. The result can comprise high resolution "raw meshes" or "raw 3D facial shapes", which can include "raw reference 3D facial shapes" (e.g., later used to generate "initial reference 3D facial shapes," which can themselves be used to generate "reference 3D facial shapes" in Phase 1). While these raw 3D facial shapes are generally of high quality, they are generally unusable in production environments because they do not share a common topology and their geometric elements (e.g., vertices) are not in correspondence. This can make it difficult to define useful transformations between the raw 3D facial shapes. Additionally, the raw 3D facial shapes may have bumpy or "shrink-wrapped" surfaces in facial hair regions, e.g., as depicted by raw reference 3D facial shape 1002 in FIG. 10.

These raw 3D facial shapes can be used to generate "template track meshes" (or "template track 3D facial shapes"), which may also be referred to as "track meshes" (or "track 3D facial shapes"). A track 3D facial shape can be fit to a selected reference frame and a respective raw 3D facial shape, and can be deformed using landmarks, contours, and ICP constraints to arrive at an initial reference 3D facial shape, which can (in some embodiments) comprise approximately 90,000 vertices. As depicted in FIG. 8, an initial reference 3D facial shape, such as initial reference 3D facial shape 802, may generally accurately represent the subject's face, but may have reconstruction errors 804 (e.g., bumps and "double chinning effects") resulting from the subject's facial hair.

The initialization phase can further comprise performing static facial hair capture processes, used to detect facial hairs in each of the facial frames and facial performance frames. Techniques such as those described in [BBN+12] can be used for this purpose. At a high level, this static facial hair capture process can involve computing auxiliary image maps by applying a Gabor orientation kernel onto each camera image in the facial frames and facial performance frames. Hysteresis and other functions can be applied to these auxiliary image maps. The resulting outputs can comprise orientation maps, hair confidence maps, and hair distance fields (sometimes referred to as "HDFs"). These maps can be used to estimate hair growing points, both in 2D and in 3D. The growing points can be constrained to align with the hair distance fields from multiple camera viewpoints. Hair fibers, representing facial hairs, can be internally represented as "facial hair geometric elements" (e.g., as described above with reference to FIG. 3) which can comprise 3D polylines of points. A series of filtering and refinement steps can be performed to smooth, align, and remove outliers from the facial hair reconstructions. Furthermore, the facial hair polylines can be grown in 3D before being refined, smoothed, merged, linked, and lastly filtered using hair confidence values computer from the HDFs. The visible skin surface, along with the root points of the static facial hair reconstructions can be used to reconstruct an "epi-surface" using, e.g., the techniques described in [BBB+10]. This epi-surface can be used to create a plausible mesh.

Further, during the initialization phase, the images comprising the facial frames and facial performance frames captured may be resized in order to more effectively perform the static facial hair capture processes described above. As an example, these images can be resized such that individual facial hairs have a width of approximately 3 pixels in order to use some of the hyperparameters of [BBN+12].

Additionally in the initialization phase, raw reconstruction error values can be determined. These raw reconstruction error values can relate to potential errors in the raw 3D facial shapes by comparing images from different cameras in the facial performance capture system. For smooth surfaces of the face (e.g., regions that are not covered by facial hair), geometric elements reconstructed from different camera images are generally expected to be in "agreement" and the reconstruction error is expected to be low. For coarse or complex surfaces of the face (e.g., regions that are covered by facial hair), geometric elements reconstructed from different camera images may be in "disagreement," and the reconstruction error may be higher. As such, the reconstruction error can be used to generate a facial hair mask used to identify regions of the subject's face that are likely covered by facial hair, as described further below.

The initialization phase can further comprise the acquisition of high quality appearance maps, including albedo, spectral intensity, and lobe, as well as deformation maps. More detail about such steps can be found in [BBB+10], [BHB+11], and [RGB+20].

C. Phase 1

As summarized above, in Phase 1 a computer system can generate a reference 3D facial shape that generally represents a subject (e.g., an actor or actress) without facial hair. This reference 3D facial shape can later (e.g., in Phase 2) be tracked to a facial performance by a subject, producing a plurality of performance 3D facial shapes, representing the subject's facial performance without facial hair. Phase 1 can also involve the determination of a facial hair mask that identifies facial regions on the subject that are likely covered by facial hair. This facial hair mask can be used to generate the reference 3D facial shape, and can also be used in other phases of the pipeline.

In slightly more detail, a computer system can retrieve initial subject facial data comprising an initial reference 3D facial shape (e.g., similar to initial reference 3D facial shape 802 in FIG. 8). The initial reference 3D facial shape can represent (e.g., visually) a subject and can comprise a plurality of initial reference geometric elements. The computer system can determine a facial hair mask based on the initial subject facial data. In some embodiments, the facial hair mask can comprise a UV texture map generated using a plurality of raw reconstruction errors corresponding to the initial reference 3D facial shape. This initial hair mask can define a plurality of probabilities corresponding to the plurality of initial reference geometric elements. Each probability of the plurality of probabilities can indicate a probability that a corresponding initial geometric element represents facial hair.

The computer system can determine a plurality of "reference facial shape weights" corresponding to the plurality of initial reference geometric elements using the facial hair mask. In some embodiments, the computer system can determine one or more facial hair probability thresholds. Then, for each initial facial reference geometric element, the computer system can compare a corresponding probability from the facial hair mask to the one or more facial hair probability thresholds and determine a corresponding reference facial shape weight based on this comparison, thereby determining the plurality of reference facial shape weights.

The computer system can generate or retrieve an estimate 3D facial shape. In some embodiments the estimate 3D facial shape can comprise a component estimate 3D facial shape comprising a plurality of component estimate geometric elements. In these embodiments, the computer system can retrieve or generate a mean component 3D facial shape and a plurality of component 3D facial shapes. In some embodiments, the plurality of component 3D facial shapes comprise a plurality of principal component 3D facial shapes. To generate the mean component 3D facial shape and the plurality of principal component 3D facial shapes, the computer system can retrieve a plurality of facial hair free 3D facial shapes corresponding to a plurality of subjects without facial hair (e.g., from a 3D facial shape database, such as the 3D facial shape database 106 depicted in FIG. 1). The computer system can determine the mean component 3D facial shape based on the plurality of facial hair free 3D facial shapes, e.g., by computing an average of these facial hair free 3D facial shapes. Further, the computer system can determine the plurality of principal component 3D facial shapes by performing a principal component analysis on the plurality of facial hair free 3D facial shapes. This plurality of principal component 3D facial shapes can comprise a plurality of normalized eigenvectors produced using the principal component analysis.

In other embodiments, the estimate 3D facial shape can comprise a previously captured 3D facial shape corresponding to the subject without facial hair. For example, an actor may currently have a beard, but may have been facial scanned weeks, months, years, etc., prior and not had a beard at that point. This facial hair free 3D facial shape can be used in place of a principal component estimate 3D facial shape if it is available to the computer system.

Using an optimization solver, the computer system can generate the component estimate 3D facial shape, which can comprise a weighted combination of the mean component 3D facial shape and the plurality of component 3D facial shapes. The optimization solver can be constrained by a reference facial shape error function relating the plurality of component estimate geometric elements, the plurality of initial reference geometric elements, and the plurality of reference facial shape weights. In some embodiments, the reference facial shape error function can comprise a weighted combination of a positional energy term, an iterative closest points energy term and an L2 regularizer. As described below, the positional energy term may be proportional to a weighted difference between the plurality of component estimate geometric elements and the plurality of initial reference geometric elements. This weighted difference can be weighted using the plurality of reference facial shape weights.

In some embodiments, the computer system can use the optimization solver to determine a plurality of component 3D facial shape weights corresponding to the plurality of component 3D facial shapes. The computer system can weigh each component 3D facial shape with a component 3D facial shape weight, thereby producing a plurality of weighted component 3D facial shapes. The computer system can generate the component estimate 3D facial shapes by performing a linear combination of the weighted component 3D facial shapes and the mean component 3D facial shape.

Further, the computer system can generate the reference 3D facial shape by combining the estimate 3D facial shape and the initial reference 3D facial shape. The reference 3D facial shape can comprise a plurality of reference geometric elements, and can represent the subject without facial hair. In some embodiments, prior to combining the estimate 3D facial shape and the initial reference 3D facial shape, the computer system can refine the estimate 3D facial shape using a refinement mesh deformation process. The computer system can perform this refinement mesh deformation process on the estimate 3D facial shape using the optimization solver, wherein the optimization solver is constrained by a refinement mesh deformation energy function comprising a weighted sum of a positional energy term and a Laplacian regularization term.

Many of the steps below can be better understood with reference to the sections below, which describe the determination of a facial hair mask and the generation of the reference 3D facial shape.

1. Determining the Facial Hair Mask

The facial hair mask can be generated using raw reconstruction error values, which, as described above, can be determined during the initialization phase, e.g., using multi-view stereo reconstruction techniques as disclosed in [BBB+ 10], which can comprise a raw reconstruction error mesh. This raw reconstruction error mesh can relate to the reconstruction of the raw reference 3D facial shape. Because much of the raw reconstruction error is caused by the presence of facial hair, the raw reconstruction error can be used to generate a facial hair mask (which can comprise a UV texture map) identifying regions of the subject's face that are covered (or likely covered) by facial hair. Raw reconstruction error values may be low for smoothly reconstructed regions of the skin (e.g., areas of the face that are not covered by facial hair) and may be higher for bumpy or "shrink-wrapped" reconstructions caused by the presence of facial hair.

Figure 9:
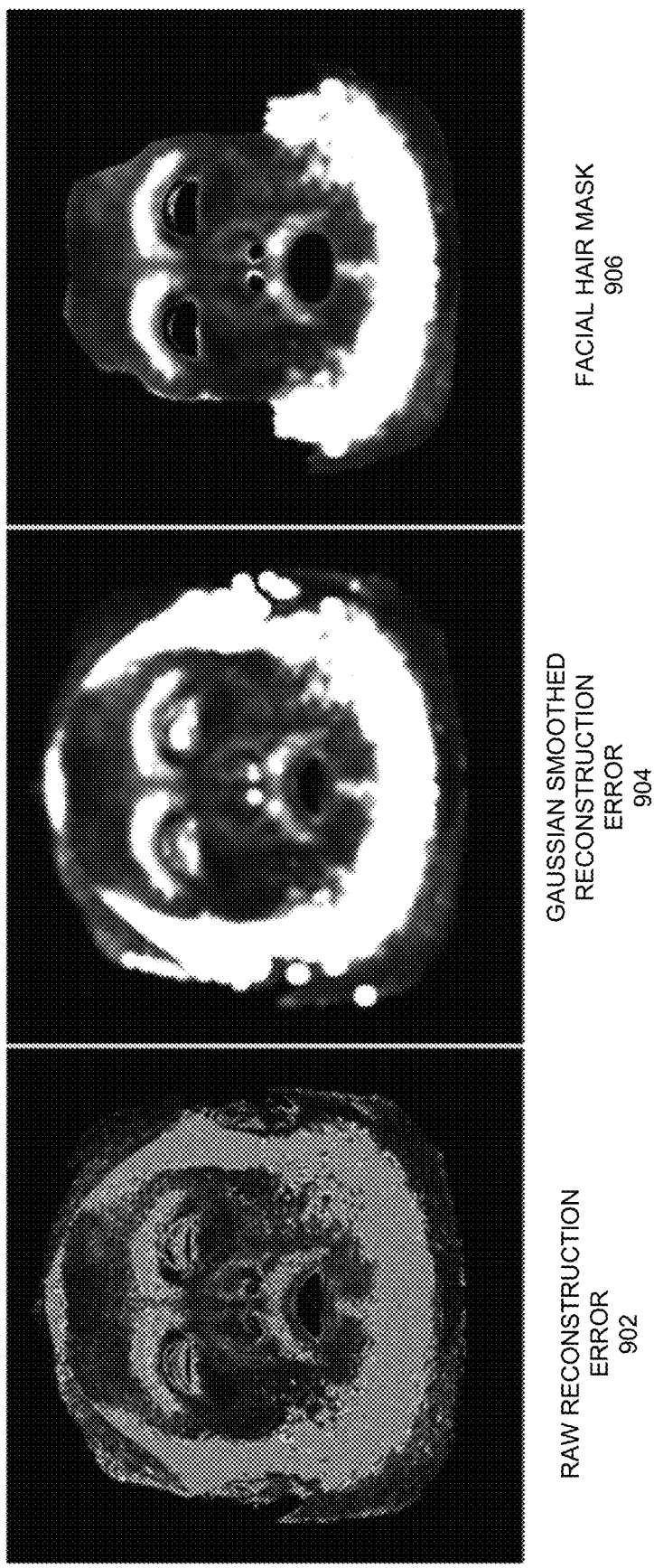
FIG. 9 summarizes a process for generating a facial hair mask from a raw reconstruction error map according to some embodiments.

The raw reconstruction error values can be transferred and normalized onto a template track mesh using closest neighbor vertex mapping, which can result in a per-vertex weighted mask. These per-vertex values can be Gaussian blurred and masked in order to create the facial hair mask. FIG. 9 shows exemplary raw reconstruction error 902, gaussian smoothed reconstruction error 904, and resulting facial hair mask 906. Notably, the facial hair mask 906 masks out the subject's eyes, lips, nostrils and "head hair", and retains facial hair such as the eyebrows, moustache, and beard. In some embodiments, the facial hair mask 906 may be non-binary, and instead may define a plurality of probabilities indicating the probability that facial hair is located in corresponding facial regions of the subject's face. The plurality of probabilities may correspond to a plurality of initial geometric elements in an initial reference 3D facial shape (such as initial reference 3D facial shape 802 in FIG. 8), such that each probability of the plurality of probabilities indicates the probability that a corresponding initial geometric element represents facial hair.

2. Generating the Reference 3D Facial Shape

Using the facial hair mask, it is possible to refined the initial 3D reference facial shape in order to generate a reference 3D facial shape (e.g., reference 3D facial shape 806 in FIG. 8). This can be accomplished by removing the bumpy or shrink-wrap reconstruction errors (e.g., reconstruction errors 804) from the initial reference 3D facial shape. This process is summarized by the flow chart in FIG. 10.

As described above, during the initialization phase, a high-resolution raw reference 3D facial shape 1002 can be used to produce an initial reference 3D facial shape 1010. As described in more detail below, the facial hair mask can be used to identify initial reference geometric elements (e.g., vertices comprising the initial reference 3D facial shape 1010) that correspond to regions of the face covered by facial hair, free of facial hair, and bordering regions. These initial reference geometric elements can be used by an optimization solver (e.g., optimization solver 126 from FIG. 1) to perform a linear blendshape optimization 1012. This linear blendshape optimization 1012 can result in a component estimate facial shape 1014. This component estimate facial shape 1014 can reasonably accurately model the structure of the subject's face underneath their facial hair, but may less accurately model regions of the face uncovered by facial hair. As an example, in FIG. 10, the nose of the initial reference 3D facial shape 1010 and the component estimate facial shape 1014 are different. After an optional component estimate facial shape refinement process 1016, the refined component estimate facial shape 1018 (or alternatively the component estimate 3D facial shape 1014, if the refinement process 1016 was omitted) can be combined with the initial reference 3D facial shape 1010 in a facial shape combination 1020, thereby generating the reference 3D facial shape 1022. The reference 3D facial shape 1022 can both accurately model the facial geometry in facial hair free regions of the subject's face (derived from the initial reference 3D facial shape 1010) and in facial hair covered regions (derived from the component estimate 3D facial shape 1014).

The linear blendshape optimization 1012 can be accomplished using a database of high quality, facial hair free 3D facial shapes, which can be retrieved from a 3D facial shape database (e.g., 3D facial shape database 106 from FIG. 1). A sample of facial hair free 3D facial shapes 1102 are shown in FIG. 1102. These facial hair free 3D facial shapes can have a consistent topology with the initial reference 3D facial shape, and can be rigidly stabilized into a canonical coordinate frame using techniques such as those disclosed in [BB 14]. They may also comprise roughly 90,000 vertices, similar to the initial reference 3D facial shape.

Figure 12:
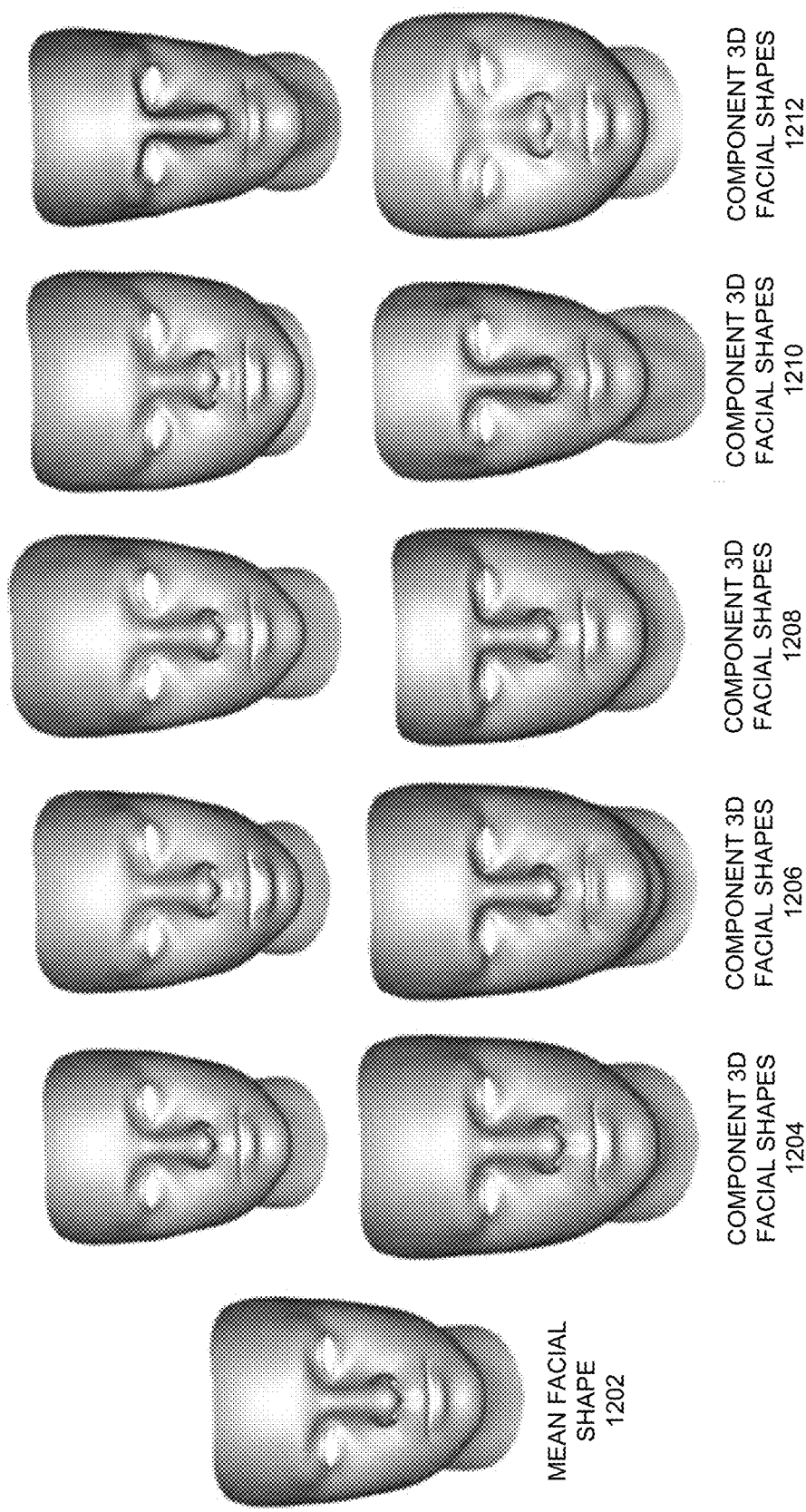
FIG. 12 shows an example of a mean facial shape and several component facial shapes that can be used to generate a reference 3D facial shape according to some embodiments.

Geometric elements can optionally be removed from the facial hair free 3D facial shapes such that they only represent the face and upper part of the neck. This can be useful because otherwise the linear blendshape optimization can overfit to the back of the head, neck, ears, etc., which may not be useful for modelling the structure of the face underneath the facial hair. These "cut" facial hair free 3D facial shapes can comprise approximately 45,000 vertices, and can be used to construct a "mean component 3D facial shape." The mean component 3D facial shape $S_{Mean}$ can comprise an average of the facial hair free 3D facial shapes, and can represent the "average" facial hair free subject, based on the facial hair free subjects used to generate the facial hair free 3D facial shapes in the database. An exemplary mean facial shape 1202 is shown in FIG. 12.

A singular value decomposition can be computed to determine principal components of the dataset of facial hair free 3D facial shapes. These normalized eigenvectors can be represented as "component 3D facial shapes", five pairs of which (component 3D facial shapes 1204 to 1212) are depicted in FIG. 12. These component 3D facial shapes can correspond to the largest facial shape changes in the database, and therefore correspond to common variations in human facial shapes. For example, component 3D facial shapes 1204 appear to account for size variations in human faces. By contrast, component 3D facial shapes 1212 appear to account for width variations. The normalized eigenvectors can be ordered by decreasing eigenvalues and the first N normalized eigenvectors can be used to create a low dimensional subspace of the mesh manifold. A linear blendshape model can be constructed with these eigenvector bases (or component 3D facial shapes) $b_i$:

$$S_{PCA} = S_{Mean} + \sum_{i=1}^{\hat{N}} \alpha_i b_i$$

To estimate the structure of the face in regions covered by facial hair, the computer system can use an optimization solver to optimize for the parameters $\alpha_i$, which can comprise component facial shape weights used to combine the mean component 3D facial shape $S_{mean}$ and a plurality of component 3D facial shapes $b_i$. The optimization solver can perform a non-linear least squares optimization and can be constrained by a reference facial shape error function, which can relate (among other things) a plurality of component geometric elements (e.g., corresponding to the component estimate facial shape $S_{PCA}$, a plurality of initial reference geometric elements (corresponding to the initial reference 3D facial shape), and a plurality of reference facial shape weights $W_{PCA}$ (determined using the facial hair mask, as described in further detail below). This non-linear least squares optimization constrained by the reference facial shape error function can be represented as:

$$\min_{\alpha} \lambda_{pos}^{(b)} E_{pos} + \lambda_{ICP}^{(b)} E_{ICP} + \lambda_{reg}^{(b)} \|\alpha\|^2$$

Where $\alpha=(\alpha_i, \ldots, \alpha_{\hat{N}})$ can comprise the component facial shape weights (also referred to as "blendshape weights"), $E_{pos}$ can comprise a positional energy term for vertices with a positional weight $\lambda_{pos}^{(b)}$. $E_{ICP}$ can comprise an iterative closest points energy term with iterative closest points weight $\lambda_{ICP}^{(b)}$. $\|\alpha\|^2$ can comprise an L2 regularizer (also referred to as a "Euclidean regularizer") with L2 regularizer weight $\lambda_{reg}^{(b)}$. In some embodiments, weight values of $\lambda_{pos}^{(b)}=1$, $\lambda_{ICP}^{(b)}=0.05$, and $\lambda_{reg}^{(b)}=0.5$ can be used. The positional energy term can be used to match the skin area of the initial 3D facial shape with the component estimate 3D facial shape $S_{PCA}$. A per-vertex weighting map $W_{PCA}$ (comprising a plurality of reference facial shape weights) can be defined as follows:

$$W_{PCA}=10(D(\mathbb{I}_{M_H<0.5}, 50) \cap \mathbb{I}_{M_H>0.5}) + \mathbb{I}_{M_H>0.4}$$

Where $D(\bullet, 50)$ denotes the morphological dilator operation for 50 iterations, $\mathbb{I}$, indicates a binary mask and $M_H$ refers to the facial hair mask described above. Thus a term such as $\mathbb{I}_{M_H>0.4}$ comprises a binary mask that has a value of 1 when a corresponding probability in the facial hair mask $M_H$ is greater than 0.4, and has a value of 0 when a corresponding probability in the facial hair mask $M_H$ is less than or equal to 0.4. Values such as 0.4 and 0.5 in the above equation can be referred to as "probability thresholds." The plurality of reference facial shape weights $W_{PCA}$ can weigh the geometric elements on the edge of facial hair regions 10 times a highly as the rest of the face, in order to prioritize accurately modelling these regions and achieving a smooth transition between clean shaven facial geometry (e.g., derived from the initial reference 3D facial shape) and estimated facial hair geometry (e.g., from the estimate or component estimate 3D facial shape).

The inclusion of the low weighted iterative closest points energy term $E_{ICP}$ can help accurately position reference geometric elements relative to the location of any modelled facial hairs, in order to prevent facial hairs penetrating the modelled skin surface or other clipping effects. Iterative closest point target positions can be set to any hair root points determined using static facial hair reconstruction (described above with reference to the initialization phase and in more detail in reference [BBN+12]). In some embodiments, the iterative closest points energy term $E_{ICP}$ can have a maximum distance threshold of 10 millimeters.

The computer system can solve the non-linear blendshape problem described with reference to the formulas above. In some embodiments, the computer system can use $\hat{N}=100$ basis vectors $b_i$ (or 3D component facial shapes) for 15 iterations using the Sparse Normal Cholesky method. This number of basis vectors may prevent overfitting to small details and preserve anatomical plausibility. The result can comprise an estimate or component estimate 3D facial shape (sometimes referred to as a "PCA fit" or "PCA blendshape"). As an alternative, if the subject had previously been facial scanned at a time during which they did not have facial hair, this facial hair free 3D facial shape can be used in place of the PCA fit in subsequence reference 3D facial shape generation steps.

Because geometric elements (e.g., vertices) at the transition between facial regions identified by the facial hair mask and facial hair free regions of the subject's face are weighted highly relative to the rest of the geometric elements, the resulting component estimate 3D facial shape may not match the skin areas outside the facial hair mask accurately. This can be addressed by performing some of the steps shown in FIG. 10, including component estimate 3D facial shape refinement 1016 and combining the resulting refined component estimate 3D facial shape 1018 with the initial reference 3D facial shape 1010.

The component estimate 3D facial shape refinement 1016 can comprise a two-step mesh deformation process, using techniques similar to those disclosed in [SCOL+04]. A mesh deformation error function can be split into two components, i.e., a vertex positional energy term and a Laplacian regularization term:

$$\min_v \lambda_{pos} E_{pos} + \lambda_{lap} E_{lap}$$

The vertex positional energy term $E_{pos}$ and Laplacian regularization term $E_{lap}$ can be defined as follows:

$$E_{pos} = \sum_{i=1}^{m} W_{pos}(i)\|v_i - u_i\|^2$$

$$E_{lap} = \sum_{i=1}^{m} W_{lap}(i)\|L(v_i) - \delta_i\|^2$$

The computer system can optimize for mesh vertex positions $v_i$ and their corresponding Laplacians $L(v_i)$ by taking the L2 residual to target position $u_i$ and target Laplacian $\delta_i$ respectively. These components can be assigned weighting factors $\lambda_{pos}$ and $\lambda_{lap}$ respectively, as well as per vertex weighting maps $W_{pos}(i)$ and $W_{lap}(i)$. m can refer to the total number of vertices in the component estimate 3D facial shape.

Having described the general structure of a Laplacian deformation optimization, it may be useful to describe the component estimate 3D facial shape refinement 1016 step in more detail. The computer system can preserve the relative shape of the refined component estimate 3D facial shape by regularizing the Laplacian to be similar to any previously determined Laplacians, e.g., by setting the global weight $\lambda_{lap}^{(r)}=25$, where $(r)$ refers to the component estimate 3D facial shape refinement step 1016.

Further, the computer system can set the vertex positions of $S_{PCA}$ to positional targets u using a binary mask for the skin region and a global weight of $\lambda_{pos}^{(r)}=10$. An additional iterative closest points energy term $E_{ICP}$ can be added to the mesh deformation error function, which can be structured similarly to the vertex positional energy term $E_{pos}$, but applied to vertex indices with a global weight of 1. All vertices inside the facial hair mask $\mathbb{I}_{M_H>0.3}$ and within a distance of 3 millimeters to a hair root below the surface of the component estimate 3D facial shape can hereby be constrained. The computer system can solve this Laplacian deformation using a standard linear least squares solver for 10 iterations to produce a refined component estimate 3D facial shape $S_R$.

Figure 10:
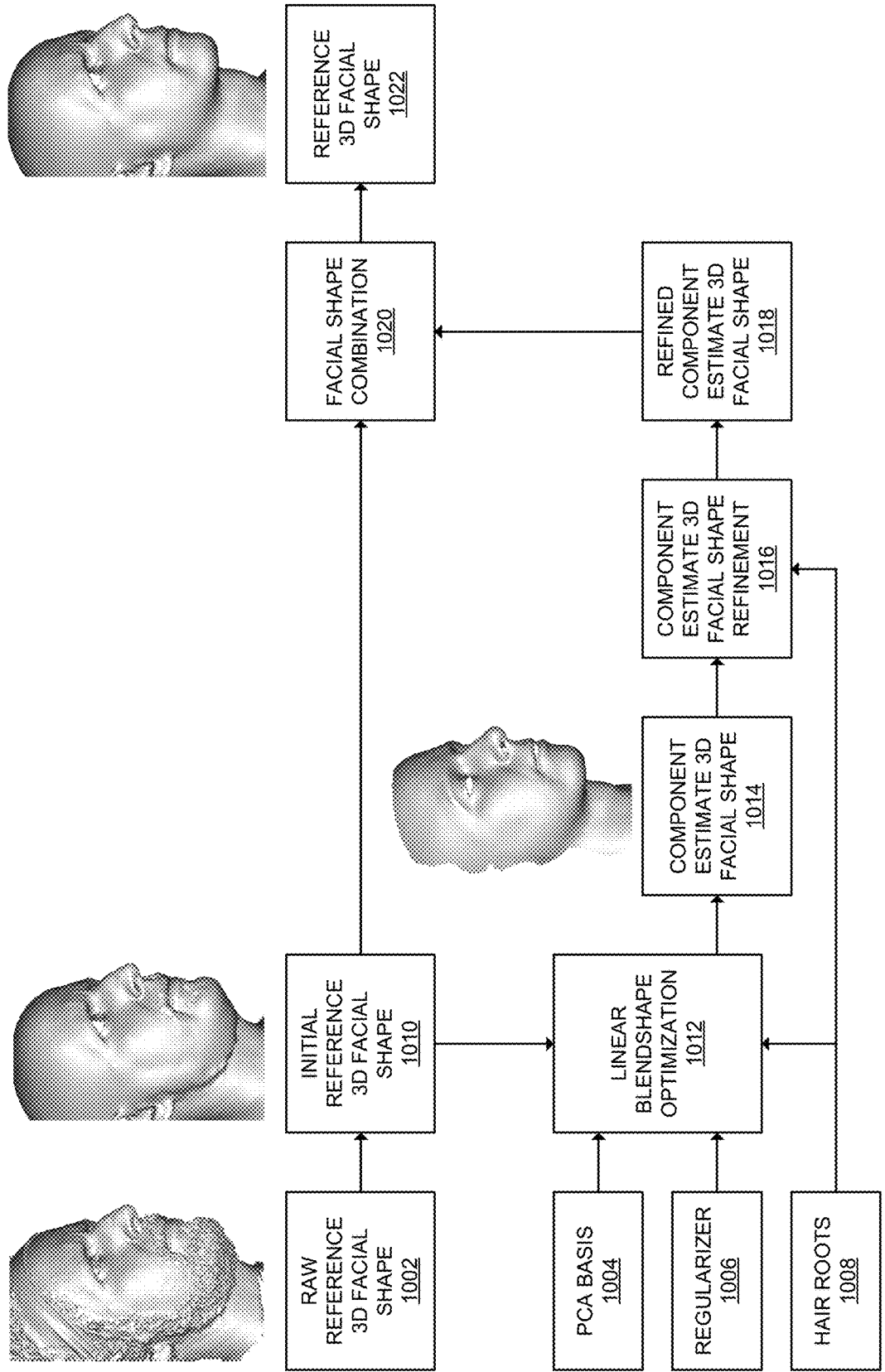
FIG. 10 shows a flowchart of an exemplary method used to generate a reference 3D facial shape according to some embodiments.
Figure 11:
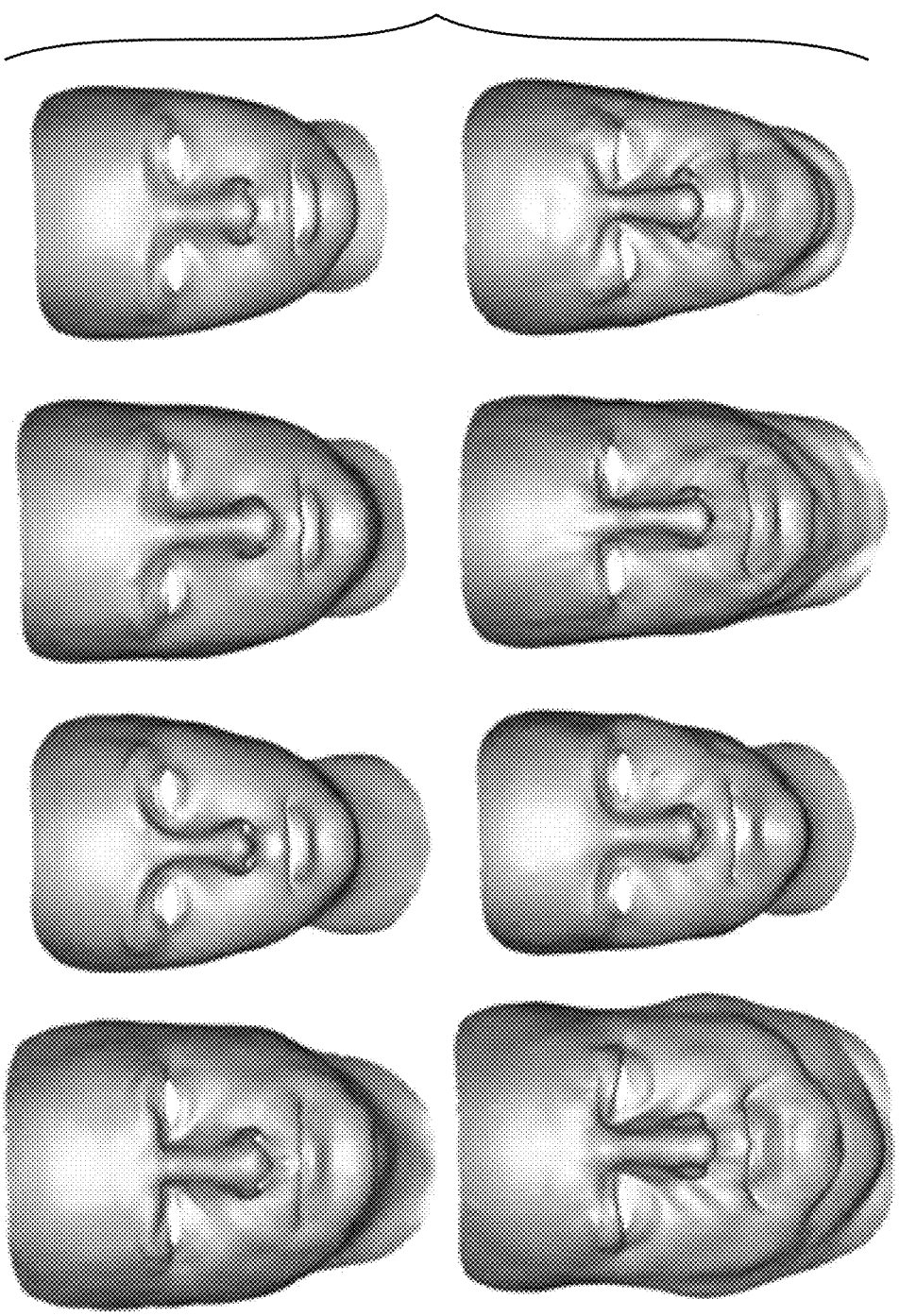
FIG. 11 shows several examples of facial hair 3D facial shapes that can be used to generate a reference 3D facial shape according to some embodiments.

As depicted in FIG. 10, the refined component estimate 3D facial shape $S_R$ 1018 can be combined with the initial reference 3D facial shape 1010 to produce a reference 3D facial shape 1022, which both accurately models the skin of the subject in facial hair free regions of the subject's face, and in regions typically covered by facial hair. In this facial shape combination process 1020, the computer system can set up a positional energy term $E_{pos}$ weighted using the facial hair mask and a probability threshold, e.g., $\mathbb{I}_{M_H<0.4}$. This positional energy term can be assigned a high global weight, e.g., $\lambda_{pos}=1000$. Further, a Laplacian can be regularized toward the Laplacian of the refined component estimate 3D facial shape $S_r$, and be assigned a weight such as $\lambda_{lap}=100$.

The resulting reference 3D facial shape can comprise a combination of the initial reference 3D facial shape and the refined component estimate 3D facial shape with a smooth transition and an atomically plausible structure in areas typically covered by facial hair, e.g., in the chin region. This reference 3D facial shape can be used to track a dynamic performance sequence (e.g., in Phase 2, as described below), using techniques similar to those presented in [BHB+11].

D. Phase 2

As summarized above, Phase 2 generally involves using the reference 3D facial shape to track a facial performance by a subject. Facial performance tracking methods, such as those described in [BHB+11] can be modified and used for this purpose. The facial hair mask (or an inverse facial hair mask $M_H^{-1}$) can be used to assign weights to the reference geometric elements in the reference 3D facial shape. Reference geometric elements corresponding to facial regions covered by facial hair can be assigned a low or zero weight, while reference geometric elements corresponding to facial hair free facial regions can be assigned a higher weight (e.g., 1). A series of Laplacian mesh deformations (see e.g., [SCOL+4]) can be used to positionally constrain the facial hair free geometric elements of the reference 3D facial shape facial hair, while allowing the geometric elements corresponding to facial hair covered regions of the reference 3D facial shape to deform in a "semi-rigid" or "as-rigidly-as-possible" manner. The result can comprise a plurality of performance 3D facial shapes (also referred to collectively as a "track mesh" $S_{ARAP}^{(t)}$ for timestep or frame t) corresponding to a plurality of facial performance frames. These plurality of performance 3D facial shapes can have consistent topologies, dense temporal correspondences, and can be devoid of bumpy reconstruction error caused by facial hair. These plurality of performance 3D facial shapes can be further refined in Phase 6, using a performance facial hair model determined in Phase 5.

Expressed in other words, the computer system can retrieve a reference frame of the subject, which can correspond to the reference 3D facial shape. This reference frame can comprise part of the initial subject facial data capture by a facial performance capture system, e.g., during the initialization phase. The computer system can also retrieve a plurality of facial performance frames corresponding to a facial performance by the subject (e.g., an actor delivering lines of dialog). The reference facial frame can comprise one or more reference images of the subject (e.g., collected from multiple camera angles) and each facial performance frame can comprise one or more performance images of the subject. Each of these images can comprise a plurality of reference pixels or performance pixels, respectively.

The computer system can use the facial mask to determine a set of facial hair free reference pixels, i.e., pixels in the reference facial frame that do not correspond to facial hair. The computer system can also use the facial hair mask to determine a plurality of sets of facial hair free performance pixels, i.e., pixels in the plurality of facial performance frames that do not correspond to facial hair. The computer system can perform a "pixel motion estimate process" (e.g., as described in [BHB+11]) between the set of facial hair free reference pixels and each set of facial hair free performance pixels, thereby determining a plurality of pixel motion estimates corresponding to the plurality of facial performance frames.

These pixel motion estimates effective describe how the regions of the subject's face (which are not covered by facial hair) move relative to the reference frame during their facial performance. The computer system can use these pixel motion estimates to determine a plurality of facial shape transformations corresponding to the plurality of facial frames. These facial shape transformations can include a facial hair free transformation component (describing the "transformation" of the facial hair free regions of the subject's face) and a facial hair transformation component (describing the transformation of the facial hair covered regions of the subjects face). The facial hair free transformation components can be derived from the pixel motion estimates. The facial hair transformation components can be derived from the facial hair free transformation components based on a semi-rigid or "as-rigid-as-possible" deformation (e.g., as described above).

The computer system can apply these plurality of facial transformations to the 3D reference facial shape, resulting in a plurality of performance 3D facial shapes, each performance 3D facial shape corresponding to a different facial performance frame of the plurality of facial performance frames. Collectively, these performance 3D facial shapes can comprise a 3D facial performance sequence, which if rendered, represents the subject's facial performance as if the subject did not have facial hair.

E. Phase 3

As described above, Phase 3 generally comprises steps associated with developing a reference facial hair model of the subject. This reference facial hair model can then be used to track the subject's facial hair during a facial performance (e.g., in Phase 4). In doing so, the computer system can generate a performance facial hair model that generally matches the movement of the subject's facial hair during a facial performance. This is similar to how the reference 3D facial shape (generated in Phase 1) can be used to generate a plurality of performance 3D facial shapes (in Phase 2).

Figure 13:
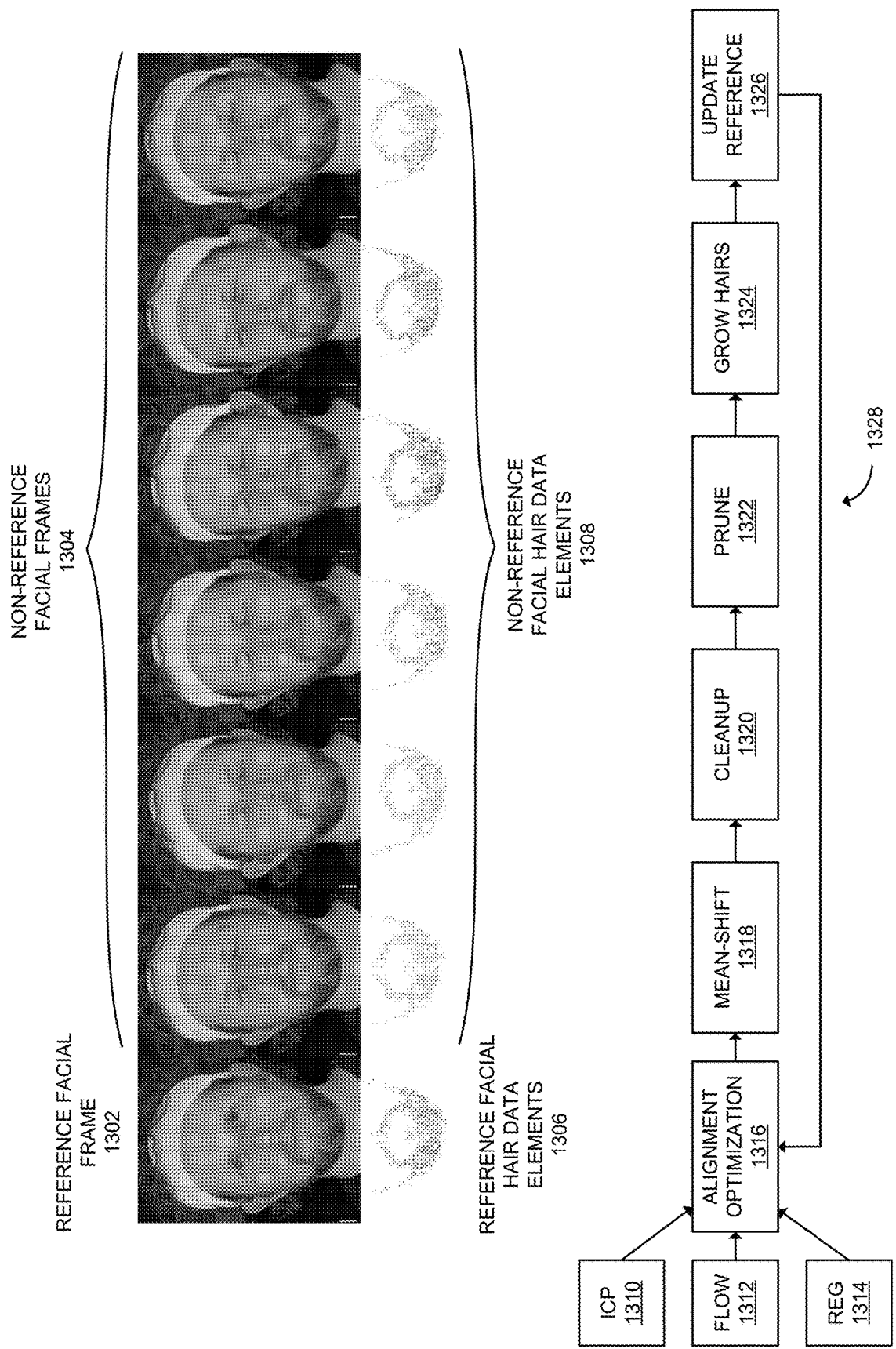
FIG. 13 shows a flowchart summarizing a process for generating a reference facial hair model according to some embodiments.

FIG. 13 summarizes the process used to generate the reference facial hair model. At some point (e.g., during the initialization phase) a plurality of facial frames corresponding to the subject can be captured, e.g., using a facial performance capture system. Each facial frame can comprise one or more images of the subject captured from one or more camera angles. The plurality of facial frames can correspond to a short head rotation sequence by the subject. One of these facial frames can be designated as a reference facial frame 1302. The other facial frames can be designated as non-reference facial frames 1304.

It is possible to perform a facial hair identification process, such as the facial hair identification process described in [BBN+12] to identify facial hairs in the reference facial frame 1302 and each of the non-reference facial frames 1304. The computer system can perform this facial hair identification process, or alternatively another system can perform the facial hair identification process (e.g., the facial performance capture system used to capture the plurality of facial frames). This facial hair identification process can result in facial hair data elements, including a set of facial hair data elements 1306 corresponding to the reference facial frame 1302 and a plurality of sets of non-reference facial hair data elements 1308 corresponding to the plurality of non-reference facial frames 1304.

For a variety of reasons, including the mutually occluding nature of facial hair, it is likely that each set of facial hair data elements fails to represent all facial hairs on the subject's face. In order to develop a more complete reference facial hair model, the computer system can combine the facial hair data elements corresponding to each facial frame into a single reference facial hair model. To do so, the computer system can perform a reference facial hair model generation process 1328. In summary, the computer system can use an optimization solver to solve a non-linear least squares optimization problem 1316 using iterative closest points 1310, optical flow 1312, and structural regularizers 1314. In doing so, the computer system can align the non-reference facial hair data elements 1308 with the reference frame 1302 and the reference facial hair data elements 1306. As an example, if the subject is making small head rotations, the non-reference facial hair data elements 1308 may be misaligned with the reference facial frame due to the angling of the subject's face (relative to the reference frame) during the head rotation.

This alignment optimization 1316 can effectively reposition and reorient the non-reference facial hair data elements 1308 based on the angular and positional difference of the subject's face. Afterwards, a series of steps 1318-1324 can be performed in order to combine the set of reference facial hair data elements 1306 with the newly aligned non-reference facial hair data elements. For example, in step 1318, the computer system can use filtering techniques (such as those described in [NWKS19] and a novel line-plane intersection mean-shifting approach to align and cluster facial hair data elements along lines. As another example, the computer system can elongate sets of facial hair data elements corresponding to existing facial hairs, and "grow" new facial hair data elements in areas where there are no existing reference facial hair data elements. The computer system can additionally perform a series of post-processing and pruning steps (similar to those described in [BBN+12] to achieve manageable runtime complexity. The reference facial hair model can be updated with the combined reference facial hair data elements 1306 and the aligned non-reference facial hair data elements (e.g., in step 1326) and the process 1328 can be repeated for the next step in the head rotation sequence. In this way, the computer system can build up a reference facial hair model that reasonably accurately and reasonably completely models the facial hair on the subject's face.

Expressed in other words, the computer system can retrieve initial subject facial data comprising a plurality of facial frames of the subject. Each facial frame can comprise one or more facial images of the subject. The plurality of facial frames can comprise a reference facial frame and a plurality of non-reference facial frames. For each facial frame of the plurality of facial frames, the computer system can perform a facial hair identification process. In doing so, the computer system can determine a plurality of initial reference facial hair data elements and a plurality of sets of non-reference facial hair data elements. The plurality of initial reference facial hair data elements and the plurality of sets of non-reference facial hair data elements can represent facial hair of the subject (e.g., a beard).

For each set of non-reference facial hair data elements, the computer system can determine a set of projected non-reference facial hair data elements, thereby determining a plurality of sets of non-reference facial hair data elements. The computer system can use an optimization solver to generate a set of alignment transformations for each set of projected non-reference facial hair data elements, thereby generating a plurality of sets of alignment transformations. The optimization solver can be constrained by a facial hair alignment error function relating the set of alignment transformations to the set of projected non-reference facial hair data elements. In some embodiments, the facial hair alignment error function can comprise a weighted combination of an iterative closest points energy term, an optical flow energy term, and a neighborhood regularizer. In some embodiments, the plurality of alignment transformations can be defined by a plurality of translation vectors and quaternion rotations.

The computer system can then apply the plurality of sets of alignment transformations to the plurality of sets of non-reference facial hair data elements, thereby determining a plurality of sets of aligned non-reference facial hair data elements. The computer system can combine the plurality of sets of aligned non-reference facial hair data elements and the plurality of initial reference facial hair data elements, thereby determining a plurality of reference facial hair data elements that represent facial hair of the subject. A reference facial hair model can comprise the plurality of reference facial hair data elements.

In some embodiments, the computer system can optionally refine the reference facial hair model prior to using it in subsequence phases of the pipeline. The computer system can determine a plurality of facial hair sets of reference facial hair data elements, each facial hair set representing a facial hair on the face of the subject. For each facial hair set of the plurality of facial hair sets, the computer system can determine a facial hair plane, thereby determining a plurality of facial hair planes. For each facial hair set of the plurality of facial hair sets, the computer system can identify one or more corresponding similar facial hair sets (e.g., modelling facial hairs that are similar to other facial hairs). Each similar facial hair set can comprise a plurality of reference facial hair data elements with a predetermined distance and a predetermined angle of a plurality of reference facial hair data elements in the facial hair set.

Then for each facial hair set of the plurality of facial hair sets, the computer system can determine a plurality of facial hair plane intersection points using a corresponding facial hair plane of the plurality of facial hair planes, the facial hair set, and one or more corresponding similar facial hair sets. The computer system can refine the reference facial hair model by combining facial hair sets of the plurality of facial hair sets based on a plurality of averages derived from the plurality of facial hair plane intersection points.

The computer system can further refine the facial hair model by removing facial hair data elements representing facial hairs with unusual or implausible geometry, e.g., facial hairs that bend at severe angles. The computer system can determine a plurality of facial hair sets of reference facial hair data elements, each facial hair set representing a facial hair on a face of the subject. For each facial hair set, the computer system can determine a facial hair bending angle, thereby determining a plurality of facial hair bending angles. The computer system can compare the plurality of facial hair bending angles to an angular threshold, thereby identifying a plurality of identified facial hair sets.

Afterwards, the computer system can split each identified facial hair sets of the plurality of identified facial hair sets into two facial hair sets. Each split facial hair set can represent a facial hair on the face of the subject. In this way, the computer system can determine a plurality of split facial hair sets, each split facial hair set comprising a plurality of reference facial hair data elements. The computer system can then refine the reference facial hair model based on the plurality of split facial hair sets.

Many of the steps described above can be better understood with reference to the sections below, which describe many of the steps depicted in FIG. 13 in more detail.

1. Hair Alignment Optimization

As described above, the facial hair alignment optimization 1316 can involve aligning non-reference facial hair data elements 1308 with the reference facial frame 1302. In order to align the non-reference facial hair data elements, the computer system can use an optimization solver (such as the Ceres solver [AMO]) to solve a non-linear least squares problem and perform this alignment. The optimization solver can be constrained by a facial hair alignment error function, represented using the formula below:

$$\min_{t,q} \lambda_{ICP} E_{ICP}(t, q) + \lambda_{Flow} E_{Flow}(t, q) + \lambda_{Neigh} E_{Neigh}(t, q)$$

The parameters (also referred to as "alignment transformations") t, and q can comprise per-hair translation vectors and quaternion rotations, which the computer system can optimize using the optimization solver. The facial hair alignment error function can comprise three components: an iterative closest points energy term $E_{ICP}$, a 2D projection energy term with optical flow $E_{Flow}$, and a structural neighborhood regularization $E_{Neigh}$. These energy terms can be weighted using (as examples) weights such as $\lambda_{ICP}=0.1$, $\lambda_{Flow}=0.0001$ and $\lambda_{Neigh}=1$.

With regards to the iterative closest points energy term $E_{ICP}$, the computer system can treat each facial hair element as a collection of directed points, and the computer system can check each non-reference facial hair data element can be checked for a closest reference facial hair data element. Herein, the "facial hair point" $p_{ij}$ denotes the $j^{th}$ point of hair i, with $p_{i1}$ denoting a hair root. The computer system can then identify correspondences between each set of non-reference facial hair data elements and the plurality of reference facial hair data elements. In more detail, for each non-reference facial hair point $p_{ij}$, the computer system can search for the closest reference facial hair point p' in the reference facial hair model. The computer system can add the pair ($p_{ij}$, p') to a set of matched facial hair points (denoted $\mathcal{M}(i)$) for an individual facial hair i, dependent on a series of conditions. As one condition, the points $p_{ij}$ and p' may need to be within a threshold distance $d_{max}$ (e.g., $d_{max}=5$ mm), as well as within a threshold angle $\theta_{max}$ (e.g., $\theta_{max}=30°$) to be considered a match. These thresholds can prevent non-identical hairs from being matched. Based on these matches, the computer system can calculate the iterative closest points energy term $E_{ICP}$ using the following formula:

$$E_{ICP}(t, q) = \frac{1}{2}\sum_{i=1}^{N_H} \sum_{(p_{ij}, p')\in\mathcal{M}(i)} \|R(q_i)p_{ij} + t_i - p'\|^2$$

$t_i$ denotes the translation vector for facial hair i and $R(q_i)$ denotes the rotation matrix corresponding to quaternion $q_i$. $N_H$ denotes the total number of hairs in a set of non-reference facial hair data elements. The computer system can repeatedly (e.g., three times) use the optimization solver and update the matched facial hair point set $\mathcal{M}(i)$. A relatively low iteration count can result in fewer updates and faster convergence.

Referring again to FIG. 13, the computer system can calculate the 2D energy term with optical flow $E_{Flow}$ from each camera viewpoint used to capture the reference facial frame 1302 and non-reference facial frames 1304. The computer system can calculate a plurality of visibility terms $V_k$, wherein $V_k(p_{ij})$ denotes the visibility of facial hair point $p_{ij}$ in camera view k. The visibility terms can comprise a cosine weighting between the camera ray and the hair point normal, which can be defined as the direction between $p_{ij}$ and a closest surface mesh point (e.g., derived from the reference 3D facial shape). The computer system can set hair points that are not visible from camera k with a predetermined depth tolerance margin (e.g., 10 millimeters) to zero.

Additionally, the computer system can determine 2D target flow projection loss points. To do so, the computer system can project facial hair point $p_{ij}$ using the projection matrix $Q_k$ of camera k to determine image coordinates $x_{ijk}=Q(p_{ij})$. The computer system can warp image coordinates using the reverse optical flow $F_k$ from each non-reference facial frame back to the reference facial frame to arrive at a target position: $\hat{x}_{ijk}=x_{ijk}+F_k(x_{ijk})$. The residual between the target position and the respective projection image coordinate can be defined as follows:

$$\mathcal{R}_{ijk}(t_i, q_i) = \|Q_k(R(q_i)p_{ij}+t_i) - \hat{x}_{ijk}\|^2$$

Further, the 2D energy term with optical flow $E_{flow}$ can be defined as:

$$E_{flow}(t, q) = \frac{1}{2}\sum_{i=1}^{N_H}\sum_{j=1}^{N_{S(i)}}\sum_{k=1}^{K} V_k(p_{ij})\psi_{huber}(\mathcal{R}_{ijk}(t_i, q_i))$$

Where $N_H$ refers to the number of facial hairs represented by a set of non-reference facial hair geometric elements, $N_{S(i)}$ is the number of geometric elements representative of a single facial hair (as depicted in FIG. 3 for example, individual hairs can be represented by connected sets of facial hair data elements), K is the number of cameras used to capture the reference facial frames and non-reference facial frames (and additionally can comprise the number of images corresponding to each facial frame), and $\psi_{huber}$ is the Huber loss function. The Huber loss function can have any appropriate scale term (e.g., 15). This formulation of this optical flow energy term $E_{flow}$ may be more effective for high frequency movement and discontinuities resulting from facial hair, relative to other optical flow formulations (e.g., as in [BBPW04]).

The neighborhood regularizer $E_{Neigh}$ can address outliers in both ICP and optical flow. For each set (or subset) of geometric elements representing an individual facial hair, the computer system can find all other "neighboring facial hairs" (each comprising sets or subsets of geometric elements) within a radius r (e.g., 5 millimeters) of that hair. This set of neighboring facial hairs can be referred to as the neighborhood of hair i or $N_r(i)$. The computer system can construct an L2 residual loss between two parameters transformations of hair i and a neighborhood hair m, as well as two respective quaternions, which can be used to calculate the neighborhood regularizer:

$$E_{neigh}(t, q) = \frac{1}{2}\sum_{i=1}^{N_H}\sum_{i'\in N_r(i)} W_{Neigh}(i, i')(\lambda_{trans}\|t_i - t_{i'}\|^2 + \lambda_{rot}\|q_i - q_{i'}\|^2$$

The neighborhood weight $W_{Neigh}(i, i')$ between two facial hairs can comprise a gaussian weighting:

$$W_{neigh}(i, i') = \exp\left(-\frac{\|p_{i1} - p_{i'1}\|^2}{2\sigma^2}\right)$$

Any appropriate value can be used for the translation weight $\lambda_{trans}$, the rotation weight $\lambda_{rot}$ and standard deviation $\sigma$. Some examples include $\sigma=2.5$, $\lambda_{trans}=0.01$, and $\lambda_{rot}=1$.

Having defined the relevant energy terms, the computer system can use any appropriate optimization solver (such as the Ceres Solver [AMO]). The computer system can use any appropriate parameters, hyperparameters, settings, underlying algorithms, etc. For example, the computer system can reinitialize the optimization solver three times with 2000 iterations each and use the Iterative Shur method, with a function tolerance of 1e-6, gradient tolerance of 1e-10, and a parameter tolerance of 1e-8.

The computer system can initialize each set of facial hair data elements (e.g., the reference facial hair data elements 1306 and non-reference facial hair data elements 1308 from FIG. 13) using the performance facial hair tracking techniques (applied to the facial rotation sequence represented by the plurality of facial frames) described above in Phase 2. For each static facial hair i, the computer system can find the closest corresponding 3D facial shape surface point to the root hair point, take the 1-ring neighborhood of this vertex point, and identify corresponding vertex positions in the respective reference 3D facial shape. The computer system can then fit a rigid transformation between these two sets of surface points using a least-squares fitting algorithm (such as [AHB87]). The computer system can use the resulting translations and rotations of this rigid transformation to initialize $t_i$ and $q_i$ in the optimization to be more robust and have better convergence.

2. Mean-Shift 3D Line-Fusion and Hair Growing

As a result of the hair alignment optimization described above, facial hair data elements corresponding to the non-reference facial frames and the reference facial frame may now be closely aligned. However, there may still be some alignment inaccuracy. In order to address this alignment accuracy, the computer system can merge facial hair data elements corresponding to facial hairs that are spatially similar and point in similar directions. The computer system can use 3D line-fusion methods based on plane intersection mean-shift variants, e.g., as described in [NWKS19].

The computer system can treat each facial hair as a collection of directed point samples $P=(P_{pos}, P_{dir})$ The computer system can construct an orthogonal plane $\Pi_P$ using one such point sample. The computer system can identify direction hair point samples within a predetermined distance and orientation of this point, e.g., within a neighborhood radius of 2 mm and within 30 degrees orientation. The computer system can extend each of these neighborhood samples to construct and intersect a 3D line with a facial hair plane $\Pi_P$. The computer system can use these intersection points to update point P to an average ($P^*_{pos}$, $P^*_{dir}$) using the following formulas:

$$P^*_{pos} = \sum_{i=0}^{M} w_i X_{i,pos} \Big/ \sum_{i=0}^{M} w_i$$

$$P^*_{dir} = \sum_{i=0}^{M} w_i X_{i,dir} \Big/ \sum_{i=0}^{M} w_i$$

$$w_i = \exp\left(-\frac{\|X_{0,pos} - X_{i,pos}\|_2^2}{2\sigma_p^2} - \frac{(\cos^{-1}(X_{0,dir} \times X_{i,dir}))^2}{2\sigma_d^2}\right)$$

In these formulas, $X_0=P$ and $X_i=(X_{i,pos}, X_{i,dir})$ can denote the intersection of the $i^{th}$ neighborhood sample with the plane $\Pi_P$. The computer system can use any appropriate values for the standard deviations $\sigma_p$ and $\sigma_d$, e.g., $\sigma_p=0.4$ and $\sigma_d=\pi/6$. A final set of aligned non-reference facial hair data elements can be denotes Q. The computer system can repeat this mean shifting step for each hair sample until the a positional difference is less than a positional distance threshold $\tau_s$ (e.g., $\tau_s=0.002$ mm) between subsequent iterations. This process of averaging facial hair points along orthogonal planes can reduce noise and align slightly misaligned facial hair data elements. More detail on mean-shifting line fusion techniques can be found in [NWKS19].

After aligning non-reference facial hair data elements using the abovementioned mean-shifting line fusion techniques, the computer system can merge overlapping hairs using a forward Euler approach. The computer system can identify all facial hair point samples in Q (i.e., a final set of aligned non-reference facial hair data elements) that are with a radius $\tau_d$ and a directional difference of less than $\tau_a$ to each reference facial hair point. The computer system can then remove these identified facial hair points from a working set W. Next, for each reference facial hair, the computer system can apply a forward Euler step s at each end of the facial hair in a current hair direction. The computer system can average all positions of these facial hair points weighted by their facial hair confidence (determined, for example, by using techniques described in [BBN+12]), remove these from the working set W and elongate the reference facial hairs to include this new point. The computer system can continue growing the reference facial hairs in this manner until no more facial hair points in the working set meet the distance and angular conditions. The computer system can repeat this process for all reference hairs.

After iterating through all the reference facial hair points, there may still be hair samples in the working step W. For these, the computer system can select a random sample and repeat the hair growing process in both directions and add them to the reference facial hair model until no more facial hair samples are in the working step W. Using this forward Euler approach the computer system can build the reference facial hair model. In some embodiments, parameters such as s=0.3 mm, $\tau_d=0.3$ mm, and $\tau_a=30°$ may be used.

After the mean-shifting and hair growing steps, the resulting reference facial hair data elements may still have high-frequency artifacts, sharp hair connections and misalignments. The computer system can use an optimization solver to align the facial hairs with the input images based on hair smoothness and photometric loss. The computer system can split hair segment connections with angles higher than 45 degrees. These may correspond to implausible or erroneously modeled facial hairs. Afterwards, the computer system can apply a hair smoothing operation by iteratively averaging facial hair points with neighboring facial hair points for four iterations. The computer system can merge and link facial hairs that either overlap or have aligning ends. Similar methods are described in [BBN+12].

Afterwards, the computer system can apply the image optimization and hair smoothing operations can be applied again and low confidence hairs can be pruned from the reference facial hair model. The computer system can compute the confidence of each follicles using a hair confidence and orientation method (e.g., as described in [BBN+12]). The computer system can use a pruning threshold $\tau_p$ (e.g., $\tau_p=0.005$) to prune away outliers that do not align with the facial frames and corresponding filter responses.

3. Post-Processing and Synthetic Hair Extension to Skin

After iterating through the plurality of facial frames depicted in 13, the computer system can perform an additional pruning step using a second pruning threshold $\tau_p$ (e.g., $\tau_p=0.01$). The computer system can perform another pruning step for small floating fibers that are far (e.g., either above or below) the 3D reference facial hair model. Additionally, the computer system can perform a merging and linking step (e.g., from [BBN+12]). The completed reference facial hair model can be used to track facial performance sequences (e.g., in Phase 4).

Optionally, the computer system can attempt to root each hair of the reference facial hair model to the 3D subject facial shape. The computer system can use a hair extension method using forward Euler and neighborhood interpolation, similar to the hair growing method described above. Starting from each root hair point, the computer system can determine a weighted directional average for neighboring hair points and neighboring surface normals. The computer system can use the resulting average of both of these directions used as the next Euler step direction and the hair extension process is repeated until the hair intersects with the mesh surface.

F. Phase 4

As summarized above, Phase 4 can generally involve the computer system using the reference facial hair model to generate a performance facial hair model, corresponding to a facial performance by the subject (e.g., captured in a plurality of facial performance frames). The performance facial hair model can effectively model the movement of the subject's facial hair during their facial performance. The performance facial hair model can comprise a plurality of sets of performance facial hair data elements. Each set of performance facial hair data element can correspond to a facial performance frame of the plurality of facial performance frames. The computer system can use the reference facial hair model generated in Phase 3 to generate the performance facial hair model. The reference facial hair model and performance facial hair model can be referred to as a "facial hair model."

In broad terms, the computer system can align the reference facial hair model to each facial frame of the plurality of facial frames using optical flow and neighborhood regularization. The computer system can use an optimization solver constrained by a performance facial hair error function for this purpose:

$$\min_{t,q} \lambda_{Flow} E_{Flow}(t, q) + \lambda_{Neigh} E_{Neigh}(t, q)$$

Optionally, the optical flow energy term $E_{Flow}$ can be modified to improve facial hair tracking. These can include flow margin drop-off and flow confidence weighting modifications. The flow margin drop-off modification can address issues associated with large head movements during the facial performance sequence, e.g., an actor's head moving out of frame. Optical flow computations can have difficulty keeping track of pixels close to the edge of the frame, causing inaccurate or unnatural tracking. The computer system can add a drop-off for 2D projected facial hair points inside an image border margin. This weighting can be integrated into an existing visibility weighting component $V_k(p_{ij})$ for facial hair point $p_{ij}$. The weighting factor can have a value of 1 in the center of the image and have a quadratic drop-off inside the margin, having zero or near zero values at the border of facial performance frames. In some embodiments, a margin width of 150 pixels can be used for 12 MP camera images.

As stated above, the computer system can also implement a flow confidence weighting modification, in order to improve facial hair tracking during the facial performance. The computer system can compare the reference facial frame and each facial performance frame and compute a confidence map with values ranging between 0 and 1. This map can indicate the accuracy of the flow and can be computed using flow turbulence, color difference and image intensity. With this confidence map for each camera, the computer system can multiply the weight of the 2D target flow projection point by the respective pixel value of the map to be more robust against inaccurate flow. Further, the flow weighting $\lambda_{flow}$ can be increased, e.g., from 5 to 10, in order to maintain a relative difference to other loss components, because areas covered by facial hair often have lower confidence. In using these optional modifications, the computer system can improve the facial hair performance tracking results, generating a more accurate performance facial hair model in the process.

Expressed in other words, the computer system can retrieve or generate (e.g., in Phase 3) a reference facial hair model comprising a plurality of reference facial hair data elements. The computer system. The computer system can additionally retrieve a plurality of facial performance frames corresponding to the facial performance by the subject. Each facial performance frame can comprise one or more facial images of the subject. For each facial performance frame of the plurality of facial performance frames, the computer system can perform an optical flow projection process on the reference facial hair model. In this way, the computer system can determine a set of projected reference facial hair data elements, thereby determining a plurality of sets of projected reference facial hair data elements corresponding to the plurality of facial performance frames.

For each facial performance frame of the plurality of facial performance frames, the computer system can use an optimization solver to generate a set of reference alignment transformations. The optimization solver can be constrained by a facial hair performance error function relating the set of reference alignment transformations to a corresponding set of projected reference facial hair data elements. The facial hair performance error function can comprise a weighted combination of an optical flow energy term and an iterative closest points energy term. The facial hair performance error function can be further weighted using a flow margin drop-off weighting and a flow confidence weighting.

In this way, the computer system can determine a plurality of sets of reference alignment transformations. The computer system can apply the plurality of sets of reference alignment transformations to the plurality of reference facial hair data elements, thereby determining a plurality of sets of aligned reference facial hair data elements. A resulting performance facial hair model can comprise a plurality of sets of sets of performance facial hair data elements, which can in turn comprise the plurality of sets of aligned reference facial hair data elements.

Optionally, the computer system can generate a combined "facial hair model" by combining the reference facial hair model and the performance facial hair model.

G. Phase 5

As described above, in Phase 5 the computer system can perform a non-rigid space-time hair refinement process in order to improve the performance facial hair model. While the performance facial hair model generated in Phase 5 may be quiet accurate, the facial hairs in the performance facial hair model may only deform rigidly, whereas facial hair can bend as a subject's face moves. As such, performing the steps of Phase 5 can better align the performance facial hair data elements in the performance facial hair model with facial hairs depicted in the facial performance frames. The computer system can use an optimization solver to generate a refined performance facial hair model, where the optimization solver is configured to minimize a non-rigid space-time error function relating to a deformation of each performance facial hair data element of the performance facial hair data model. The non-rigid space-time error function can comprise a weighted combination of a hair distance field energy term, a positional energy term, a length energy term, a Laplacian energy term, and a temporal energy term. This non-rigid space-time hair refinement process is described in more detail below.

In Phase 5, the computer system can perform a non-linear optimization, where the inputs and outputs are facial hair points in each facial hair. This refinement is formulated over time, and the computer system can take multiple frames into consideration at once to address temporal jitter using a temporal regularization term. The computer system can use an optimization solver to perform this non-rigid optimization, and the computer system can be constrained by a non-rigid space-time error function with frame (time) index t:

$$\min_{P} \sum_{t} \sum_{i} \lambda_H E_{HDF}(p_i^t) + \lambda_p E_{pos}(p_i^t) + \\ \lambda_{len} E_{len}(p_i^t) + \lambda_{lap} E_{lap}(p_i^t) + \lambda_t E_{temp}(p_i^t)$$

The result is a more accurate temporally tracked performance facial hair model that deforms and accurately matches the subject's facial hair throughout the captured performance.

The energy terms in the non-rigid space-time error function can include a hair distance field (HDF) energy term $E_{HDF}$. This energy term can encode the distance from each image pixel to a closet facial hair geometric element. The computer system can compute these HDFs during a facial hair identification process, e.g., during Phase 3 or the initialization phase. This HDF energy term can encourage the optimization solver to move hair points toward a detected hair line in the image plane. In some embodiments, the HDF energy term can be weighted using a weight $\lambda_H=0.01$. The computer system can calculate it with the following formula (in which $H_k^t$ denotes the HDF for camera k at time t:

$$E_{HDF}(p_i^t) = \sum_k \sum_j \psi\left(\left\|\frac{1}{H_k^t(Q_k p_{ij}^t) + \epsilon} - 1\right\|_2^2\right) V_k(p_{ij})$$

The computer system can also use positional, length, and Laplacian regularizes, which can preserve the position and geometry of facial hair data elements when the HDF is noisy or ill-defined. The computer system can use a positional energy term $E_{pos}$ towards the rigid initialization, a segment length energy term $E_{len}$, as well as a one-dimensional Laplacian energy term $E_{lap}$. Optionally, for positional regularization, the computer system can increase the root weight by a factor of 100, to prevent facial hair data elements representing the tip of facial hairs from drifting. While the segment length energy term can regularize the current facial hair points toward previous rigid distances between points with an L2 norm, $E_{lap}$ can do the same for the 1D Laplacian vector for the rigid solution. In some embodiments, the computer system can use weights $\lambda_p=0.01$, $\lambda_{len}=100$ and $\lambda_{lap}=1000$ for $E_{pos}$, $E_{len}$, and $E_{lap}$ respectively.

The temporal energy term $E_{temp}$ can preserve consistent in 3D facial hair geometry over time. In some embodiments, the computer system can weigh the temporal energy term $E_{temp}$ using a weight $\lambda_t=1$. The computer system can use a second-order central difference formula to allow for a smooth trajectory between temporally adjacent facial hair points $p_{ij}^{t-1}$, $p_{ij}^t$, $p_{ij}^{t+1}$ etc. The computer system can rigidly align the hair geometry within this 3 frame temporal window, e.g., using previously computed facial hair transformations (t, q) computed during Phase 4. $\hat{T}_i^{t-1}$, $\hat{T}_i^t$, and $\hat{T}_i^{t+1}$ can denote facial hair points that have been aligned with a reference frame using these facial hair transformations. The computer system can calculate the temporal energy term $E_{temp}$ using the following formula:

$$E_{temp}(p_i^t) = \sum_j \left\|\hat{T}_i^{t-1} p_{ij}^{t-1} - 2\hat{T}_i^t p_{ij}^t + \hat{T}_i^{t+1} p_{ij}^{t+1}\right\|_2^2$$

Having calculated all the relevant energy terms, the computer system can use an optimization solver constrained by the non-rigid space time error function. The computer system can solve this optimization for all facial hairs one frame at a time, alternating between frames while keeping the results for neighboring frames fixed. This can provide an efficient optimization strategy and temporally smooth solution within 5 iterations on each frame.

H. Phase 6

As described above, during Phase 6, the computer system can use the performance facial hair model to refine the plurality of performance 3D facial shapes representing the subject's facial performance. Intuitively, because facial hairs grow from the surface of the skin, the performance facial hair model and the performance 3D facial shapes are expected to be aligned with one another and move similarly during the facial performance. As such, the performance 3D facial shapes can be refined based on the performance facial hair model, e.g., by modifying geometric elements corresponding to regions of the face sometimes covered by facial hair (e.g., the chin) based on the performance facial hair model.

In more detail, the computer system can determine a set of reference regions on the 3D reference facial shape determine in Phase 1. These reference regions can be implemented using vertex landmark points $v_l^{(0)}$ (where $^{(0)}$ indicates the vertex landmark point corresponds to the reference frame) or "deformation handles" distributed over the reference 3D facial shape, typically in locations covered by facial hair. Each reference region can have an associated radius, e.g., 20 millimeters, which along with the vertex landmark point is sufficient to define the reference region. Other methods of defining reference regions may also be possible.

Figure 14:
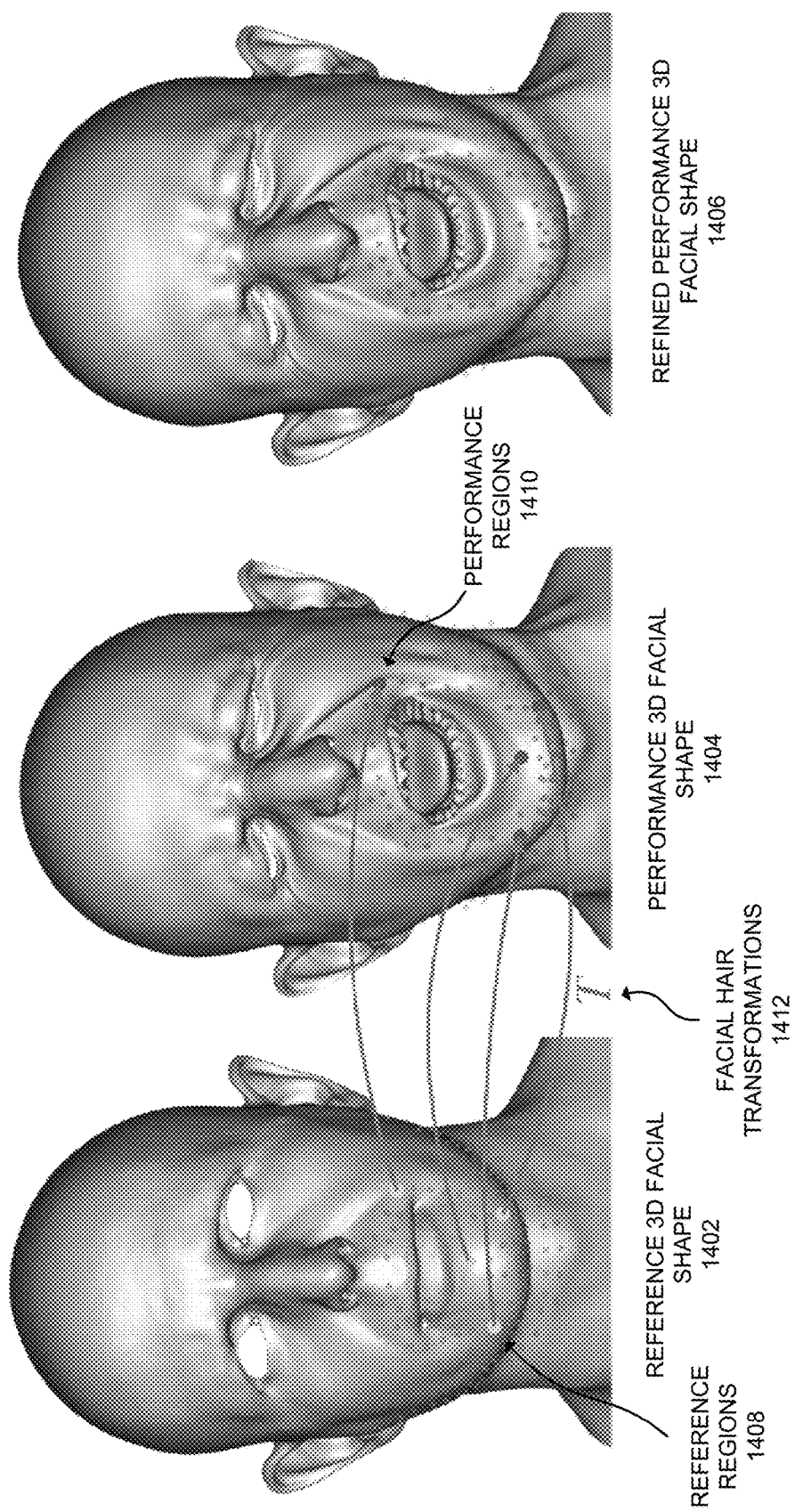
FIG. 14 shows a diagram relating to a 3D facial shape refinement process according to some embodiments.

The computer system can also determine a set of performance regions for each performance 3D facial shape of the plurality of performance 3D facial shapes (e.g., determined in Phase 2). These sets of performance regions may be in correspondence with the set of reference regions, e.g., for each performance region there may be a corresponding reference region. The performance regions can also be implemented using vertex landmark points $v_l^{(t)}$ (where $^{(t)}$ indicates the vertex landmark point corresponds to the $t^{th}$ frame of the facial performance frames) or deformation handles, and may also have a radius, e.g., of 20 mm. FIG. 14 shows a reference 3D facial shape 1402 with reference regions 1408, as well as a performance 3D facial shape 1404 with performance regions 1410.

For each reference region of the plurality of reference regions, the computer system can identify all reference facial hair data elements located within that reference region on the reference facial hair model, e.g., identifying all reference facial hair data elements within the radius distance of the vertex landmark point defining that reference region. This subset of reference facial hair data elements may be denoted $\mathcal{H}_l^{(0)}$. In this way, the computer system can determine a set of subsets of reference facial hair data elements from the plurality of reference facial hair data elements from the reference facial hair model.

Likewise, for each performance region on each of the performance 3D facial shapes, the computer system can identify all performance facial hair data elements located within that performance region on the performance facial hair model, e.g., identifying all performance facial hair data elements within the radius distance of the vertex landmark point defining that reference regions. This subset of performance facial hair data elements may be denoted $\mathcal{H}_l^{(t)}$. In this way, the computer system can determine a plurality of sets of subsets of performance facial data elements.

Because the reference regions and performance regions (and the reference facial hair model and performance facial hair model) are in correspondence, it is possible to determine the position of a given hair point in both a subset of reference facial hair data elements and a corresponding subset of performance facial hair data elements. From this, the computer system can determine a rigid "facial hair transformation" $T_l$ between two point clouds representing a subset of reference facial hair data elements $\mathcal{H}_l^{(0)}$ and a corresponding subset of performance facial hair data elements $\mathcal{H}_l^{(t)}$ in each performance facial frame, e.g., using a rigid point cloud alignment approach such as that disclosed in [AHB87].

As depicted in FIG. 14, The computer system can apply these facial hair transformations $T_l$ 1412 which can be applied to the reference regional geometric elements to produce a plurality of transformed reference regional geometric elements $T_l v_l^{(0)}$. The computer system can use this plurality of transformed reference regional geometric elements to calculate a regional positional energy term $E_{pos}^{(h)}$:

$$E_{pos}^{(h)}(v) = \sum_{l \in L} \left\|v_l - T_l v_l^{(0)}\right\|^2$$

Further, the computer system can calculate an absolute shape preservation energy term $E_{pos}^{(s)}$ using, for example, the reference 3D facial shape determined in Phase 1. The target positions from this mesh at time step t are referred to as $p^{*(t)}$:

$$E_{pos}^{(s)} = \sum_{i=1}^{m} W_s(i) \|v_i - v_i^{(t)}\|^2$$

Similar to the description of previous sections above, m can refer to the total number of vertices in the reference 3D facial shape, and $W_s$ can refer to an inverse binary thresholded version of the facial hair mask $M_H$ using a probability threshold of 0.4. Additionally, the computer system can calculate a Laplacian regularizer $E_{lap}$ using the Laplacian from $S_R^{(t)}$ as the target. A refined performance error function can comprise a sum of these energy terms, and the computer system can use an optimization solver, constrained by the refined performance error function, to determine a refined performance 3D facial shape (e.g., refined performance 3D facial shape 1406 in FIG. 14):

$$\min_{v} \lambda_{pos}^{(h)} E_{pos}^{(h)}(v) + \lambda_{pos}^{(s)} E_{pos}^{(s)}(v) + \lambda_{lap} E_{lap}(v)$$

In some embodiments, weights of $\lambda_{pos}^{(h)}=1$, $\lambda_{pos}^{(s)}=100$, and $\lambda_{lap}=25$ may be used. Optionally, to further improve performance and address issues due to out-of-frame-subject movement, the computer system can introduce an Laplacian target constraint energy term $E_{lap}^{(n)}$, which can be weighted, e.g., with a weight $\lambda_{lap}^{(n)}=25$:

$$E_{lap}^{(n)} = \sum_{i=1}^{m} W_n(i) \|v_i - v_i^{(t)}\|^2$$

The result of Phase 6 is a plurality of refined performance 3D facial shapes, which are temporally tracked and accurately represent the movement of the subject's skin underneath their facial hair. However, to further improve the appearance of the refined performance 3D facial shapes, the computer system can apply a mesh smoothing process (similar to the mesh smoothing process described in [BHB+11]) with a half-window size of 10 and 5 iterations. The resulting refined performance 3D facial shapes may even more accurately represent the subject. In combination with the performance facial hair model, the refined performance 3D facial shapes may comprise a plausible overall digital double of the subject.

I. Afterwards

By performing the steps and phases described above, the computer system can produce a reference 3D facial shape, a reference facial hair model, a plurality of performance 3D facial shapes, and a performance facial hair model. As described throughout, these 3D facial shapes and facial hair models may be useful to filmmakers. For example, a filmmaker can render the plurality of performance 3D facial shapes and the performance facial hair data elements in the performance facial hair data model, in order to produce a realistic animated facial performance corresponding to the subject.

Figure 15:
FIG. 15 shows examples of artistically edited facial hair models.

Further, embodiments of the present disclosure enable 3D artists to easily modify a subject's facial hair style without requiring the subject to restyle their facial hair in real life. FIG. 15 shows three performance 3D facial shapes and artist edited facial hair models 1500. In each case, a 3D artist defined a UV mask used to identify and remove facial hair elements. In this way, the 3D artist created a Hulihee beard, anchor beard, and a circle beard style. 3D artists can also conceivably manipulate the facial hair data elements themselves, making them longer or shorter depending on the needs of the film production. As an example, methods according to embodiments could be used to produce a facial hair model corresponding to an actor with a short beard. Facial hair data elements in the facial hair model could be extended to create a long "wizard's beard" (e.g., for a fantasy film), which may be impossible or impractical for the actor to grow in real life. The long bearded facial hair model could be rendered along with the actor's 3D performance facial shapes, or rendered and superimposed over video of the actor's actual performance. In this way, the actor could portray a long-bearded wizard in the film, without requiring the actor to wear a prosthetic beard (which may be distracting or unrealistic).

III. COMPUTER SYSTEM

Figure 16:
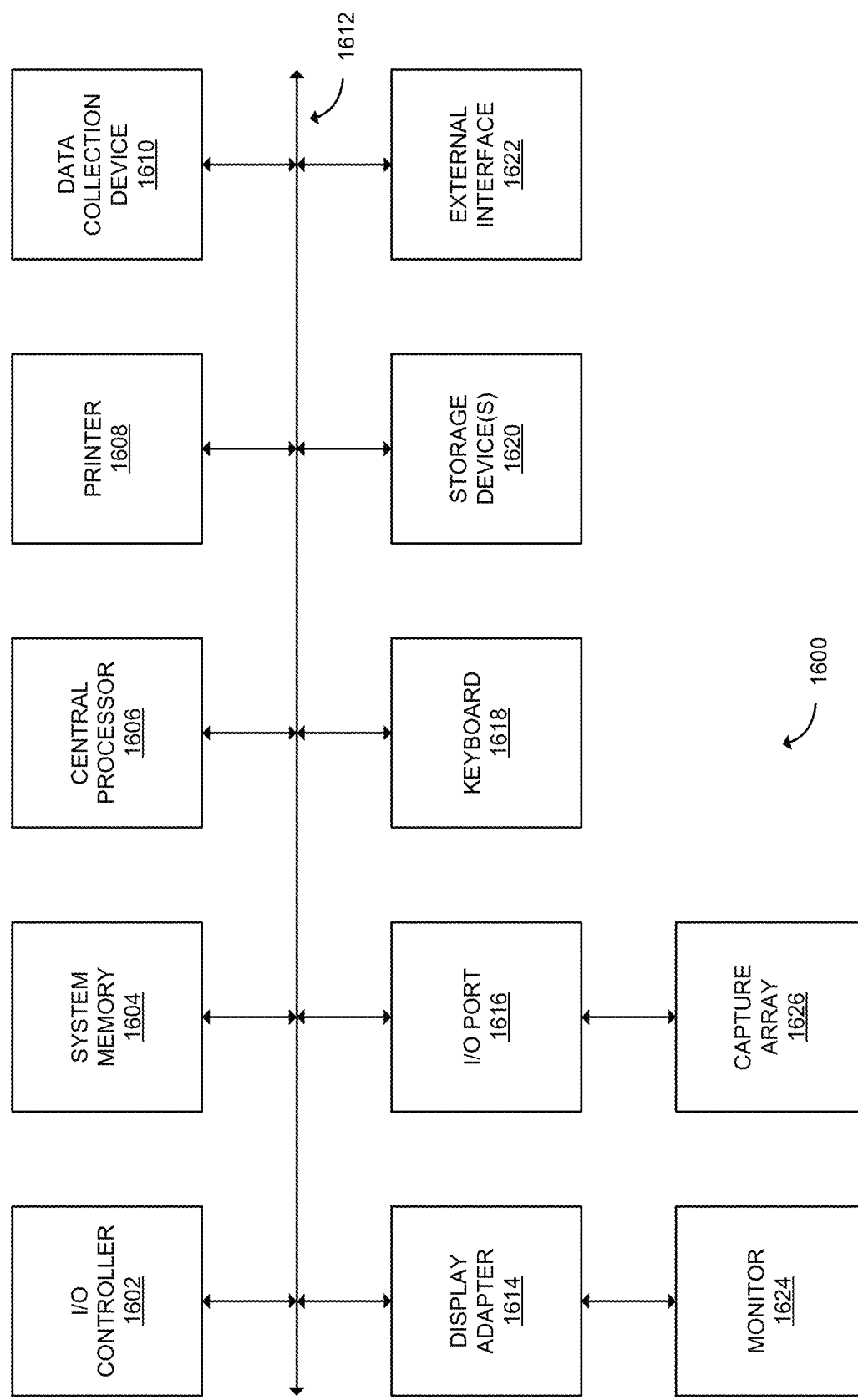
FIG. 16 shows an exemplary computer system according to some embodiments.

Any of the computer systems mentioned herein may utilize any suitable number of subsystems. Examples of such subsystems are shown in FIG. 16 in computer system 1600. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 16 are interconnected via a system bus 1612. Additional subsystems such as a printer 1608, keyboard 1618, storage device(s) 1620, monitor 1624 (e.g., a display screen, such as an LED), which is coupled to display adapter 1614, and others are shown. Peripherals and input/output (I/O) devices, which couple to I/O controller 1602, can be connected to the computer system by any number of means known in the art such as input/output (I/O) port 1616 (e.g., USB, FireWire). For example, I/O port 1616 or external interface 1622 (e.g. Ethernet, Wi-Fi, etc.) can be used to connect computer system 1600 to a wide area network such as the Internet, a mouse input device, or a scanner. Optionally, the computer system 1600 can be connected to a capture array 1626, such as an array of camera or lasers used to perform 3D capture, including facial capture and facial performance capture.

The interconnection via system bus 1612 allows the central processor 1606 to communicate with each subsystem and to control the execution of a plurality of instructions from system memory 1604 or the storage device(s) 1620 (e.g., a fixed disk, such as a hard drive, or optical disk), as well as the exchange of information between subsystems. The system memory 1604 and/or the storage device(s) 1620 may embody a computer readable medium. Another subsystem is a data collection device 1610, such as a camera, microphone, accelerometer, and the like. Any of the data mentioned herein can be output from one component to another component and can be output to the user.

A computer system can include a plurality of the same components or subsystems, e.g., connected together by external interface 1622, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein, including those listed in the List of References below, are incorporated by reference in their entirety for all purposes. None is admitted to be prior art.

IV. LIST OF REFERENCES

[AHB87] K. S. Arun, T. S. Huang, and S. D. Blostein. Least-Squares Fitting of Two 3D Point Sets. *IEEE Transactions on Pattern Analysis and Machine Intelligence*, PAMI-9(5):698-700, 1987.

[AMO] Sameer Agarwal, Keir Mierle, and Others. Ceres Solver. http://ceres-solver.org.

[BB14] Thabo Beeler and Derek Bradley. Rigid Stabilization of Facial Expressions. *ACM Trans. Graph.*, 33(4), July 2014

[BBB+10] Thabo Beeler, Bernd Bickel, Paul Beardsley, Bob Sumner, and Markus Gross. High-Quality Single-Shot Capture of Facial Geometry. *ACM Trans. Graph.*, 29(4), July 2010

[BBN+12] Thabo Beeler, Bernd Bickel, Gioacchino Noris, Paul Beardsley, Steve Marschner, Robert W. Sumner, and Markus Gross. Coupled 3D Reconstruction of Sparse Facial Hair and Skin. *ACM Trans. Graph.,* 31(4), July 2012.

[BBPW04] Thomas Brox, Andres Bruhn, Nils Papenberg, and Joachim Weicket. High Accuracy Optical Flow Estimation Based on a Theory for Warping. In Tomas Pajdla and Jiří Matas. editors, *Computer Vision—ECCV 2004.* pages 25-36, Berlin, Heidelberg, 2004. Springer Berlin Heidelberg

[BHB+11] Thabo Beeler, Fabian Hahn, Derek Bradley, Bernd Bickel, Paul Beardsley Craig Gotsman, Robert W. Sumner, and Markus Gross. High-Quality Passive Facial Performance Capture Using Anchor Frames. *ACM Trans. Graph.,* 30(4), July 2011.

[NWKS19] Giljoo Nam, Chenglei Wu, Min H. Kim, and Yaser Sheikh. Strand-Accurate Multi-View Hair Capture. In Proceedings of the *IEEE/CVF Conference on Computer Vision and Pattern Recognition (CVPR),* pages 155-164, June 2019.

[RGB+20] Jérémy Riviere, Paulo Gotardo, Derek Bradley, Abhijeet Ghosh, and Thabo Beeler. Single-Shot High-Quality Facial Geometry and Skin Appearance Capture. *ACM Trans. Graph.,* 39(4), July 2020.

[SCOL+04] Olga Sorkine, Daniel Cohen-Or, Yaron Lipman, Marc Alexa, Christian Rössl, and Hans-Peter Seidel. Laplacian Surface Editing. In *Proceedings of the 2004 Eurographics/ACM SIGGRAPH Symposium on Geometry Processing,* SGP '04, page 175-184, New York, NY, USA, 2004. Association for Computing Machinery.

What is claimed is:

1. A computer-implemented method of generating a reference facial hair model that represents facial hair of a subject, the computer-implemented method comprising performing, by a computer system:

retrieving initial subject facial data comprising a plurality of facial frames of the subject, each facial frame comprising one or more facial images of the subject, wherein the plurality of facial frames comprise a reference facial frame and a plurality of non-reference facial frames;

for each facial frame of the plurality of facial frames, performing a facial hair identification process, thereby determining a plurality of initial reference facial hair data elements and a plurality of sets of non-reference facial hair data elements, wherein the plurality of initial reference facial hair data elements and the plurality of sets of non-reference facial hair data elements represent facial hair of the subject;

for each set of non-reference facial hair data elements, determining a set of projected non-reference facial hair data elements, thereby determining a plurality of sets of projected non-reference facial hair data elements;

generating using an optimization solver, for each set of projected non-reference facial hair data elements, a set of alignment transformations, thereby determining a plurality of sets of alignment transformations, wherein the optimization solver is constrained by a facial hair alignment error function relating the set of alignment transformations to the set of projected non-reference facial hair data elements;

applying the plurality of sets of alignment transformations to the plurality of sets of non-reference facial hair data elements, thereby determining a plurality of sets of aligned non-reference facial hair data elements;

combining the plurality of sets of aligned non-reference facial hair data elements and the plurality of initial reference facial hair data elements, thereby determining a plurality of reference facial hair data elements, wherein the reference facial hair model comprises the plurality of reference facial hair data elements, wherein the plurality of reference facial hair data elements comprises a plurality of facial hair sets of reference facial hair data elements, each facial hair set comprising a three-dimensional representation of a different facial hair of the subject;

retrieving a plurality of facial performance frames corresponding to a facial performance by the subject, wherein each facial performance frame comprises one or more facial images of the subject;

for each facial performance frame of the plurality of facial performance frames, performing an optical flow projection process on the reference facial hair model, thereby determining a set of projected reference facial hair data elements, thereby determining a plurality of sets of performance facial hair data elements corresponding to the plurality of facial frames;

for each facial performance frame of the plurality of facial performance frames, determining a set of projected reference facial hair data elements, thereby determining a plurality of sets of projected reference facial hair data elements corresponding to the plurality of facial performance frames;

for each facial performance frame of the plurality of facial performance frames, generating using an optimization solver, a set of reference alignment transformations, wherein the optimization solver is constrained by a facial hair performance error function relating the set of reference alignment transformations to a corresponding set of projected reference facial hair data elements, thereby determining a plurality of sets of reference alignment transformations; and applying the plurality of sets of reference alignment transformations to the plurality of reference facial hair data elements, thereby determining a plurality of sets of aligned reference facial hair data elements, wherein a performance facial hair model comprises a plurality of sets of performance facial hair data elements comprising the plurality of sets of aligned reference facial hair data elements;

retrieving or generating a reference 3D facial shape, wherein the reference 3D facial shape represents a face of the subject, wherein the reference 3D facial shape comprises a plurality of reference geometric elements;

retrieving or determining a facial hair mask comprising a plurality of probabilities corresponding to a plurality of facial regions on a face of the subject, each probability indicating the probability that facial hair is located within a corresponding facial region;

retrieving or generating a plurality of performance 3D facial shapes that represent the face of the subject during the facial performance, each performance 3D facial shape comprising a plurality of performance geometric elements;

determining a set of reference regions corresponding to the reference 3D facial shape, each reference region of the set of reference regions corresponding to a plurality of reference region geometric elements from the plurality of reference geometric elements;

determining a plurality of sets of performance regions corresponding to the plurality of performance 3D facial shapes, each performance region of the plurality of sets of performance regions corresponding to a plurality of performance region geometric elements from the plurality of performance geometric elements;

generating a plurality of performance refinement weights using the facial hair mask;

determining, based on the set of reference regions, a set of subsets of reference facial hair data elements from the plurality of reference facial hair data elements from the reference facial hair model, wherein each subset of reference facial hair data elements corresponds to a reference region of the set of reference regions;

determining, based on the plurality of sets of performance regions, a plurality of sets of subsets of performance facial hair data elements from the plurality of sets of performance facial hair data elements from the performance facial hair model, wherein each subset of performance facial hair data elements corresponds to a performance region of the plurality of sets of performance regions;

for each subset of performance facial hair data elements of the plurality of sets of subsets of performance facial hair data elements, determining a facial hair transformation between that subset of performance facial hair data elements and a corresponding subset of reference facial hair data elements, thereby determining a plurality of facial hair transformations;

applying the plurality of facial hair transformations to the plurality of reference regional geometric elements, thereby determining a plurality of transformed reference regional geometric elements; and for each facial performance frame of the plurality of facial performance frames, generating a refined performance 3D facial shape using an optimization solver, wherein the optimization solver is constrained based on a refined performance error function relating the plurality of transformed reference regional geometric elements, the plurality of performance geometric elements corresponding to that facial frame, and the plurality of performance refinement weights, the computer system thereby generating a plurality of refined performance 3D facial shapes.

2. The computer-implemented method of claim 1, wherein the facial hair alignment error function comprises a weighted combination of an iterative closest points energy term, an optical flow energy term, and a neighborhood regularizer.

3. The computer-implemented method of claim 1, wherein the plurality of sets of alignment transformations are defined by a plurality of translation vectors and quaternion rotations.

4. The computer-implemented method of claim 1, further comprising:
determining a plurality of facial hair sets of reference facial hair data elements, each facial hair set representing a facial hair on a face of the subject;
for each facial hair set of the plurality of facial hair sets, determining a facial hair plane, thereby determining a plurality of facial hair planes;
for each facial hair set of the plurality of facial hair sets, identifying one or more corresponding similar facial hair sets, each similar facial hair sets comprising a plurality of reference facial hair data elements within a predetermined distance and a predetermined angle of a plurality of reference facial hair data elements in the facial hair set;
for each facial hair set of the plurality of facial hair sets, determining a plurality of facial hair plane intersection points using a corresponding facial hair plane of the plurality of facial hair planes, the facial hair set, and one or more corresponding similar facial hair sets; and
refining the reference facial hair model by combining facial hair sets of the plurality of facial hair sets based on a plurality of averages derived from the plurality of facial hair plane intersection points.

5. The computer-implemented method of claim 1, further comprising:
determining a plurality of facial hair sets of reference facial hair data elements, each facial hair set representing a facial hair on a face of the subject;
for each facial hair set, determining a facial hair bending angle, thereby determining a plurality of facial hair bending angles;
comparing the plurality of facial hair bending angles to an angular threshold, thereby identifying a plurality of identified facial hair sets;
splitting each identified facial hair set of the plurality of identified facial hair sets into two split facial hair sets, each split facial hair set representing a facial hair on the face of the subject, thereby determining a plurality of split facial hair sets, each split facial hair set comprising a plurality of reference facial hair data elements; and
refining the reference facial hair model based on the plurality of split facial hair sets.

6. The computer-implemented method of claim 1, wherein the reference facial frame comprises a plurality of reference pixels, and wherein retrieving or generating the plurality of performance 3D facial shapes comprises:
determining a set of facial hair free reference pixels from the reference facial frame using the facial hair mask;
for each facial performance frame of the plurality of facial performance frames, determining a set of facial hair free performance pixels using the facial hair mask, thereby determining a plurality of sets of facial hair free performance pixels;
performing a pixel motion estimate process between the set of facial hair free reference pixels and each set of facial hair free performance pixels, thereby determining a plurality of pixel motion estimates corresponding to the plurality of facial performance frames;
determining a plurality of facial shape transformations corresponding to the plurality of facial performance frames, wherein each facial shape transformation comprises a facial hair free transformation component and a facial hair transformation component, wherein the facial hair free transformation component is derived from a corresponding pixel motion estimate of the plurality of pixel motion estimates, wherein the facial hair transformation component comprises a semi-rigid transformation based on the facial hair free transformation component; and
generating a plurality of performance 3D facial shapes by applying the plurality of facial shape transformations to the reference 3D facial shape, each performance 3D facial shape of the plurality of performance 3D facial shapes corresponding to a facial performance frame of the plurality of facial performance frames, each performance 3D facial shape comprising a plurality of performance geometric elements.

7. The computer-implemented method of claim 6, wherein the initial subject facial data also includes an initial reference 3D facial shape, wherein the initial reference 3D facial shape represents the subject and comprises a plurality of initial geometric elements, and wherein the reference 3D facial shape is generated and the facial hair mask is determined using a process performed by the computer system comprising:

determining the facial hair mask based on the initial subject facial data, wherein the plurality of probabilities correspond to the plurality of initial geometric elements, wherein each probability of the plurality of probabilities indicates a probability that a corresponding initial geometric element represents facial hair;

determining a plurality of reference 3D facial shape weights corresponding to the plurality of initial geometric elements using the facial hair mask;

retrieving or generating a mean component 3D facial shape and a plurality of component 3D facial shapes;

generating, using an optimization solver, a component estimate 3D facial shape comprising a plurality of component estimate geometric elements, the component estimate 3D facial shape comprising a weighted combination of the mean component 3D facial shape and the plurality of component 3D facial shapes, the optimization solver constrained by a reference facial shape error function relating the plurality of component estimate geometric elements, the plurality of initial geometric elements, and the plurality of reference 3D facial shape weights; and generating the reference 3D facial shape by combining the component estimate 3D facial shape and the initial reference 3D facial shape.

8. A computer system comprising:

a processor; and a non-transitory computer readable medium coupled to the process, the non-transitory computer readable medium comprising code, executable by the processor for implementing the computer-implemented method of claim 1.

9. A computer-implemented method of generating a performance facial hair model corresponding to a facial performance by a subject, the computer-implemented method comprising performing, by a computer system:

retrieving or generating a reference facial hair model comprising a plurality of reference facial hair data elements, wherein the plurality of reference facial hair data elements comprises a plurality of facial hair sets of reference facial hair data elements, each facial hair set comprising a three-dimensional representation of a different facial hair of the subject;

retrieving a plurality of facial performance frames corresponding to the facial performance by the subject, wherein each facial performance frame comprises one or more facial images of the subject;

for each facial performance frame of the plurality of facial performance frames, performing an optical flow projection process on the reference facial hair model, thereby determining a set of projected reference facial hair data elements, thereby determining a plurality of sets of projected reference facial hair data elements corresponding to the plurality of facial performance frames;

for each facial performance frame of the plurality of facial performance frames, generating using an optimization solver, a set of reference alignment transformations, wherein the optimization solver is constrained by a facial hair performance error function relating the set of reference alignment transformations to a corresponding set of projected reference facial hair data elements, thereby determining a plurality of sets of reference alignment transformations;

applying the plurality of sets of reference alignment transformations to the plurality of reference facial hair data elements, thereby determining a plurality of sets of aligned reference facial hair data elements, wherein the performance facial hair model comprises a plurality of sets of performance facial hair data elements comprising the plurality of sets of aligned reference facial hair data elements;

retrieving or generating a reference 3D facial shape, wherein the reference 3D facial shape represents a face of the subject, wherein the reference 3D facial shape comprises a plurality of reference geometric elements;

retrieving or determining a facial hair mask comprising a plurality of probabilities corresponding to a plurality of facial regions on a face of the subject, each probability indicating the probability that facial hair is located with a corresponding facial region;

retrieving or generating a plurality of performance 3D facial shapes that represent a face of the subject during a facial performance, each performance 3D facial shape comprising a plurality of performance geometric elements;

determining a set of reference regions corresponding to the reference 3D facial shape, each reference region of the set of reference regions corresponding to a plurality of reference region geometric elements from the plurality of reference geometric elements;

determining a plurality of sets of performance regions corresponding to the plurality of performance 3D facial shapes, each performance region of the plurality of sets of performance regions corresponding to a plurality of performance region geometric elements from the plurality of performance geometric elements;

generating a plurality of performance refinement weights using the facial hair mask;

determining, based on the set of reference regions, a set of subsets of reference facial hair data elements from the plurality of reference facial hair data elements from the reference facial hair model, wherein each subset of reference facial hair data elements corresponds to a reference region of the set of reference regions;

determining, based on the plurality of sets of performance regions, a plurality of sets of subsets of performance facial hair data elements from the plurality of sets of performance facial hair data elements from the performance facial hair model, wherein each subset of performance facial hair data elements corresponds to a performance region of the plurality of sets of performance regions;

for each subset of performance facial hair data elements of the plurality of sets of subsets of performance facial hair data elements, determining a facial hair transformation between that subset of performance facial hair data elements and a corresponding subset of reference facial hair data elements, thereby determining a plurality of facial hair transformations;

applying the plurality of facial hair transformations to the plurality of reference regional geometric elements, thereby determining a plurality of transformed reference regional geometric elements; and for each facial performance frame of the plurality of facial performance frames, generating a refined performance 3D facial shape using an optimization solver, wherein the optimization solver is constrained based on a refined performance error function relating the plurality of transformed reference regional geometric elements, the plurality of performance geometric elements corresponding to that facial frame, and the plurality of performance refinement weights, the computer system thereby generating a plurality of refined performance 3D facial shapes.

10. The computer-implemented method of claim 9, wherein the facial hair performance error function comprises a weighted combination of an optical flow energy term and an iterative closest points energy term.

11. The computer-implemented method of claim 9, wherein the facial hair performance error function is weighted using a flow margin drop-off weighting and a flow confidence weighting.

12. The computer-implemented method of claim 9, further comprising generating using the optimization solver, a refined performance facial hair model, wherein the optimization solver is configured to minimize a non-rigid space-time error function relating to a deformation of each performance facial hair data element of the performance facial hair model.

13. The computer-implemented method of claim 12, wherein the non-rigid space-time error function comprises a weighted combination of a hair distance field energy term, a positional energy term, a length energy term, a Laplacian energy term, and a temporal energy term.

14. The computer-implemented method of claim 9, further comprising generating a facial hair model comprising the reference facial hair model and the performance facial hair model.

15. The computer-implemented method of claim 9, wherein retrieving or generating the reference facial hair model comprises:
retrieving initial subject facial data comprising a plurality of facial frames of the subject, each facial frame comprising one or more facial images of the subject, wherein the plurality of facial frames comprise a reference facial frame and a plurality of non-reference facial frames;
for each facial frame of the plurality of facial frames, performing a facial hair identification process, thereby determining a plurality of initial reference facial hair data elements and a plurality of sets of non-reference facial hair data elements, wherein the plurality of initial reference facial hair data elements and the plurality of sets of non-reference facial hair data elements represent facial hair of the subject;
for each set of non-reference facial hair data elements, determining a set of projected non-reference facial hair data elements, thereby determining a plurality of sets of projected non-reference facial hair data elements;
generating, using an optimization solver, for each set of projected non-reference facial hair data elements, a set of alignment transformations, thereby determining a plurality of sets of alignment transformations, wherein the optimization solver is constrained by a facial hair alignment error function relating the set of alignment transformations to the set of projected non-reference facial hair data elements;
applying the plurality of sets of alignment transformations to the plurality of sets of non-reference facial hair data elements, thereby determining a plurality of sets of aligned non-reference facial hair data elements; and
combining the plurality of sets of aligned non-reference facial hair data elements and the plurality of initial reference facial hair data elements, thereby determining a plurality of reference facial hair data elements that represent facial hair of the subject, wherein the reference facial hair model comprises the plurality of reference facial hair data elements.

16. The computer-implemented method of claim 9, wherein retrieving or generating the plurality of performance 3D facial shapes comprises:
retrieving initial subject facial data comprising a plurality of facial frames of the subject, each facial frame comprising one or more facial images of the subject, wherein the plurality of facial frames comprise a reference facial frame comprising a plurality of reference pixels and a plurality of non-reference facial frames each comprising a plurality of non-reference pixels;
retrieving or determining a facial hair mask comprising a plurality of probabilities corresponding to a plurality of facial regions on a face of the subject, each probability indicating the probability that facial hair is located within a corresponding facial region;
determining a set of facial hair free reference pixels from the reference facial frame using the facial hair mask;
for each facial performance frame of the plurality of facial performance frames, determining a set of facial hair free performance pixels using the facial hair mask, thereby determining a plurality of sets of facial hair free performance pixels;
performing a pixel motion estimate process between the set of facial hair free reference pixels and each set of facial hair free performance pixels, thereby determining a plurality of pixel motion estimates corresponding to the plurality of facial performance frames;
determining a plurality of facial shape transformations corresponding to the plurality of facial performance frames, wherein each facial shape transformation comprises a facial hair free transformation component and a facial hair transformation component, wherein the facial hair free transformation component is derived from a corresponding pixel motion estimate of the plurality of pixel motion estimates, wherein the facial hair transformation component comprises a semi-rigid transformation based on the facial hair free transformation component; and
generating a plurality of performance 3D facial shapes by applying the plurality of facial shape transformations to the reference 3D facial shape, each performance 3D facial shape of the plurality of performance 3D facial shapes corresponding to a facial performance frame of the plurality of facial performance frames, each performance 3D facial shape comprising a plurality of performance geometric elements.

17. The computer-implemented method of claim 16, wherein the initial subject facial data also includes an initial reference 3D facial shape comprising a plurality of initial reference geometric elements, and wherein retrieving or generating the reference 3D facial shape and generating or retrieving the facial hair mask comprises:
determining the facial hair mask based on the initial subject facial data, wherein the plurality of probabilities correspond to the plurality of initial reference geometric elements, and wherein each probability of the plurality of probabilities indicates a probability that a corresponding initial geometric element represents facial hair;
determining a plurality of reference 3D facial shape weights corresponding to the plurality of initial reference geometric elements using the facial hair mask;
retrieving or generating a mean component 3D facial shape and a plurality of component 3D facial shapes;
generating, using an optimization solver, a component estimate 3D facial shape comprising a plurality of component estimate geometric elements, the component estimate 3D facial shape comprising a weighted combination of the mean component 3D facial shape and the plurality of component 3D facial shapes, the optimization solver constrained by a reference facial shape error function relating the plurality of component estimate geometric elements, the plurality of initial reference geometric elements, and the plurality of reference 3D facial shape weights; and generating the reference 3D facial shape by combining the component estimate 3D facial shape and the initial reference 3D facial shape.

* * * * *